(12) United States Patent
Yuasa et al.

(10) Patent No.: US 7,862,876 B2
(45) Date of Patent: Jan. 4, 2011

(54) FILM FOR SUPPRESSING CONDUCTION OF RADIATION HEAT AND HEAT INSULATING MATERIAL USING THE SAME

(75) Inventors: Akiko Yuasa, Kyoto (JP); Shinya Kojima, Aichi (JP); Kazutaka Uekado, Hyogo (JP)

(73) Assignee: Panasonic Corporation, Osaka (JP)

( * ) Notice: Subject to any disclaimer, the term of this patent is extended or adjusted under 35 U.S.C. 154(b) by 1367 days.

(21) Appl. No.: 10/595,069

(22) PCT Filed: Jun. 17, 2004

(86) PCT No.: PCT/JP2004/008850

§ 371 (c)(1),
(2), (4) Date: Jan. 30, 2006

(87) PCT Pub. No.: WO2005/068180

PCT Pub. Date: Jul. 28, 2005

(65) Prior Publication Data

US 2007/0059499 A1    Mar. 15, 2007

(30) Foreign Application Priority Data

Jan. 20, 2004   (JP) ................. 2004/011376

(51) Int. Cl.
*B32B 15/08*   (2006.01)
*B32B 33/00*   (2006.01)

(52) U.S. Cl. .................. 428/69; 428/421; 428/457

(58) Field of Classification Search .................. None
See application file for complete search history.

(56) References Cited

U.S. PATENT DOCUMENTS

| 4,076,889 A | 2/1978 | Sasaki et al. |
| 5,714,272 A * | 2/1998 | Ishimaru .................. 428/624 |
| 2002/0048665 A1 | 4/2002 | Fields et al. |
| 2003/0134078 A1 * | 7/2003 | Urata et al. .................. 428/69 |

FOREIGN PATENT DOCUMENTS

| JP | S57/159437 U | 10/1982 |
| JP | 61/89840 A | 5/1986 |
| JP | H5/164296 A | 6/1993 |
| JP | H5/193668 A | 8/1993 |
| JP | 2000/62105 A | 2/2000 |
| JP | 2000/310392 A | 11/2000 |
| JP | 2001/107480 A | 4/2001 |
| JP | 3085643 U | 2/2002 |
| JP | 2003271044 A * | 9/2003 |

OTHER PUBLICATIONS

English language translation of JP 2003-271044A, Sep. 2003.*
International Search Report of PCT/JP04/008850.
Supplementary European Search Report for Appl. No. EP 04 74 6319, Sep. 9, 2010, Panasonic Corp.

* cited by examiner

*Primary Examiner*—Ramsey Zacharia
(74) *Attorney, Agent, or Firm*—RatnerPrestia

(57) ABSTRACT

Provided are a film for suppressing conduction of radiation heat to sustain an infrared-ray-reflective capability over a long term and exhibit an excellent radiation-heat suppressivity, and a heat-insulating material using the same. A film for suppressing conduction of radiation heat includes a resin film having at least an infrared-ray absorptivity of lower than 25%, an infrared-ray-reflection layer and an adhesive layer, wherein an infrared-ray reflectivity is 50% or higher.

9 Claims, 12 Drawing Sheets

FILM FOR SUPPRESSING CONDUCTION OF RADIATION HEAT AND HEAT INSULATING MATERIAL USING THE SAME

This application is a U.S. NATIONAL PHASE APPLICATION of PCT INTERNATIONAL APPLICATION PCT/JP2004/008850, filed Jun. 17, 2004.

TECHNICAL FIELD

The present invention relates to a film for suppressing conduction of radiation heat having an excellent infrared-ray reflecting effect and to a heat insulating material using the same.

BACKGROUND ART

Recently, there are vigorous movements to push forward energy saving as measures against warming, a global environmental issue. As for apparatuses using hot/cold heat, a heat insulating material having an excellent heat insulation capability is demanded in the viewpoint of effective utilization of heat. Particularly, where a heat insulating material is used in an elevated-temperature range of exceeding 150° C., energy-saving effects appear conspicuously. Applications are expected for printers, copiers, liquid-crystal projectors and semiconductor manufacturing apparatuses.

In the high-temperature range of exceeding 150° C., because the radiation-heat conduction component due to infrared rays (hereinafter, referred to as IR) is not ignorable differently from that in the room temperature range, the capability as the heat-insulating material decreases. This requires a technique to suppress against radiation heat conduction. Concerning the technique for suppressing radiation heat, there is disclosed in JP-A-5-164296 a heat-insulating film having a metal-foil layer and protection layer over a plastic film.

FIG. 8 is a sectional view of a heat-insulation film in the conventional art.

Heat-insulating film 1 is plastic film 3 having thereon surface layer 2 of a metal high in purity but coarse in crystal-grain size. Over planar surface of layer 2, metal thin layer 4 having a small thermal emissivity is layered in a manner having extremely-flattened crystal grains. Over a surface of metal thin layer 4, protection layer 5 is formed for covering metal thin layer 4 in a manner stably keeping its surface while allowing IR and far-infrared rays (hereinafter, referred to as FIR) to transmit freely.

The heat rays, of IR and FIR intruding heat-insulating film 1, are to repeat total reflections within metal thin layer 4 having extremely-flat crystal grains and then reflect toward the outside, thus obtaining high heat-insulating effects.

However, the above structure does not disclose how to join the metal thin layer and the protection layer together, hence being impractical. Should an adhesive be used, IR and FIR are to be absorbed in the adhesive, to raise a problem of reducing the IR reflection effect.

Meanwhile, JP-A-5-193668 discloses a heat-insulating lamination film having an IR reflectiveness, as an envelope material for a vacuum heat insulating material.

FIG. 9 is a sectional view of a heat insulating lamination film in the conventional art. The heat-insulating lamination film has protection layer 5, FIR-reflection layer 6, gas-barrier layer 7 and thermal bonding layer 8 that are bonded together by an adhesive 9A. The heat-insulating lamination film can obtain a high FIR reflectivity because of using an FIR transmissive substance for protection layer 5 and a metal foil for FIR-reflection layer 6.

Furthermore, because of using the FIR transmissive substance in protection layer 5, IR is allowed to reach FIR-reflection layer 6.

However, the IR transmissive substance is indefinitely defined wherein the adhesive 9A of between protection layer 5 and FIR-reflection layer 6 is indefinite because there is defined nothing but such an adhesive as not to lose the FIR transmission effect.

The present invention is for solving the conventional problems, and it is an object thereof to provide a film having an excellent IR reflection effect for suppressing conduction of radiation heat.

In the meanwhile, in the temperature range of from −30 to 100° C. or around, it is a practice to use, as a general heat-insulating material, a fibrous substance such as glass wool or a foamed substance such as urethane foam. In the applications requiring a heat-insulating material higher in capability, there is means applied with a vacuum heat-insulating material structured by covering a core material holding a space of fine gaps with an envelope material shielding against external-air intrusion, to thereby reduce the pressure in the space thereof.

A vessel thermally fused of metal or the like can be used for the envelope material of a vacuum heat-insulating material. However, in the low-temperature range not requiring heat resistance, it is a frequent practice to use a plastic-metal lamination film, having a thermal bonding layer, a gas-barrier layer and a protection layer, that is comparatively to be bent or curved.

Recently, the requirement for the vacuum heat-insulating material is in a tendency toward a diversification. Thus, demand is for a further higher capability of vacuum heat-insulating material.

Meanwhile, in the office appliances such as computers, character printers and copiers and fluorescent lamps incorporating inverters, etc., there is a strong demand for a high-capability heat-insulating material that can be used at around 150° C. in order not to convey the heat caused from a heat-generating member arranged in the main body to a toner less resistive to heat or an interior precise component.

There are inorganic fibrous materials, such as glass wool, and inorganic foamed substance as usual heat-insulating materials, that are to be used in a temperature range at around 150° C. However, there is a strong demand for a higher-capability heat-insulating material. In this temperature range, it is possible to apply only those of vacuum heat-insulating materials that are under especial high-temperature specifications, due to the reliability of lamination films thereof.

Heat conduction, generally, is represented in terms of the sum over in-gas heat conduction, in-solid heat conduction, radiation heat conduction and convectional heat conduction. At around normal temperature, in-gas and in-solid heat conductions are predominant wherein radiation heat conduction is less to contribute.

However, radiation heat conduction gradually increases with increasing temperature. At 100° C. and higher, the effect of heat conduction due to radiation heat becomes no longer ignorable. In the further higher temperature range, radiation heat conduction becomes predominant. Accordingly, at 150° C. or the around, there is a need of a heat-insulating material specification taking account of reduced radiation heat conduction.

Conventionally, there are a number of reports of arts to suppress against radiation heat by means of IR-reflective metal surfaces, IR-reflective paints and so on. Because of experiencing IR radiation energy over a long term, the metal surface problematically deteriorates due to its surface oxidation. The IR-reflective paints are not sufficient in their IR reflectivities. For this reason, a JP-A-2001-107480 discloses, as a heat-shield sheet, a sheet that a flexible sheet member, at its one or both surfaces, is formed with a heat-reflective paint layer having a resin paint mixed therein with a ceramic or inorganic compound having a heat reflectiveness, to interpose a metal foil between the heat-reflective paint layer and the sheet member.

FIG. 17 is a cross-sectional view of the heat-shield sheet in the conventional art. Heat-shield sheet 20 is structured by bonding aluminum foils on both surfaces of sheet member 22 to thereby form upper reflective film 23A and lower reflective film 23B and forming, by application, heat-reflective paint layers 24A, 24B on exposure surfaces of the aluminum foils. In using the heat-reflective paint layers of heat-shield sheet 20 directed toward a heat source such as solar light, the aluminum foil at its film has a high reflectivity of IR radiation energy, hence being allowed to efficiently reflect emission energy. This is considered to conspicuously improve heat-shield capability. However, in the above structure, there is a difficulty in obtaining a sufficient heat-shield effect despite using the IR-reflective metal foils and the reflective paint layers together. This is because the incident IR first is partly reflected by the IR reflective paint layer but the major part thereof is absorbed therein and conducted by in-solid heat conduction into the adjacent metal foil. The IR does not reach the metal foil and the metal foil does not exhibit its IR reflectiveness. As a result, the major part of radiation heat is converted into in-solid heat conduction, thus being conducted.

Meanwhile, Japanese Utility Model No. 3,085,643 discloses a heat-insulation tape that a paint-type heat-insulating material is applied under high pressure onto a surface of a metal-foil tape and a strong hear-resistive adhesive is applied onto a backside thereof, to be wound in a roll form by sandwiching an adhesion-preventive paper tape thereon.

However, in also the conventional-art structure, the paint-type heat-insulating material on the surface of the metal-foil tape absorbs the greater part of IR, thus making it difficult to obtain a sufficient heat-shield effect.

The invention is for solving the conventional problem, and it is an object thereof to provide a radiation-heat suppression film that sustains the IR reflecting capability over a long term and exhibits an excellent radiation-heat suppression.

Meanwhile, as for capability improvement of the vacuum heat-insulating material, for suppressing influence of radiation to obtain high heat-insulation capability, JP-A-5-193668 discloses a heat-insulating lamination film as an envelope material made up with a protection layer, an FIR reflection layer, a gas-barrier layer formed by a metal foil, and a thermal bonding layer, wherein the protection layer uses an FIR-transmissive substance.

Where PET, in general use, is formed into a protection layer, the incident IR reflects in part thereof but the greater part thereof is absorbed in the protection layer and conduced by in-solid heat conduction to the adjacent gas-barrier layer.

In the above conventional art structure, the incident IR transmits through the protection layer, of an FIR-transmissive substance, and then reflects upon the gas-barrier layer. As a result, it serves as a vacuum heat-insulating material capable of suppressing against radiation-heat conduction. In this manner, there is described to provide a vacuum heat-insulating material suppressing against in-gas and radiation heat conductions and having an excellent heat-insulation capability.

There is no especial definition of the FIR-transmissive substance herein, wherein a methylpentene polymer film is described effective.

However, in the conventional art structure, the FIR-transmissive substance and the FIR-reflection are indefinitely defined. Radiation heat conducts by absorbing, principally, 2-25 μm of IR and again emitting it.

As shown in FIG. 26, the wavelength distribution of radiation heat changes depending upon the temperature of a heat-generation source, wherein the peak shifts to the lower wavelength as the temperature is higher.

It can be seen that the radiation-heat emission spectrum, at 150° C., has a peak wavelength at or around 7 μm, having a form having a shoulder somewhat closer to the higher wavelength. It can therefore be considered that the radiation-heat conduction at 150° C. can be suppressed by impeding the IR absorption in the vicinity of 4-20 μm. Namely, it is of importance to define an IR-transmissive substance and IR-reflective substance in the range of 4-20 μm.

It is an object of the present invention to provide a vacuum heat-insulating material that is to sustain an IR-reflective capability over a long term and exhibit an excellent radiation-heat-conduction suppressivity. It is another object to provide a vacuum heat-insulating material that can be used in a high-temperature range where application is conventionally difficult to implement, by providing a radiation-heat-conduction suppressivity.

DISCLOSURE OF THE INVENTION

The present invention provides a film for suppressing conduction of radiation heat including: a resin film having at least an infrared-ray absorptivity of lower than 25%; an infrared-ray-reflection layer; and a adhesive layer; wherein an infrared-ray reflectivity is 50% or higher.

The adhesive layer is constituted with a bonding area and a non-bonding area, to laminate together the resin film and the infrared-ray-reflection layer by bonding.

The resin film has a melting point of at least 150° C. or higher. The infrared-ray-reflection layer is a metal foil.

Meanwhile, there is provided a vacuum heat insulating material including: a core material; and an envelope material covering the core material; wherein the envelop material has an interior reduced in pressure, the envelope material having a lamination structure having a thermal bonding layer, a gas-barrier layer and a protection layer having a radiation-heat-conduction suppressivity; the protection layer using the film for suppressing conduction of radiation heat.

DETAILED DESCRIPTION OF THE PREFERRED EMBODIMENTS

Figure 1:
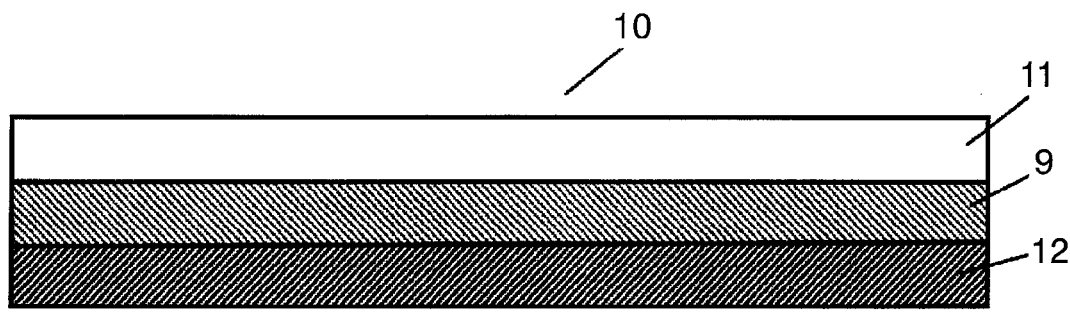
FIG. 1 is a cross-sectional view of a film for suppressing conduction of radiation heat in embodiment 1 of the present invention.

Embodiments of the present invention will be explained below while referring to the drawings. Note that the embodiments are not to limit the invention. Like elements are denoted with like reference numerals, to omit the detailed explanation thereof. The figures are mere typical ones not to correctly show the dimensions and positions.

As for the resin-film IR absorptivity in the invention, an IR absorptivity is given by an infrared emissivity obtained at 150° C. by the use of a Fourier-transform infrared spectrometer JIR5500, manufactured by JEOL Ltd., and an infrared emission unit IR-IRR200. An IR reflectivity is given by a value measured at a relative reflection angle 12 degrees of a reflector by the use of an infrared spectrometer 270-30, manufactured by Hitachi, Ltd.

Embodiment 1

Figure 2:
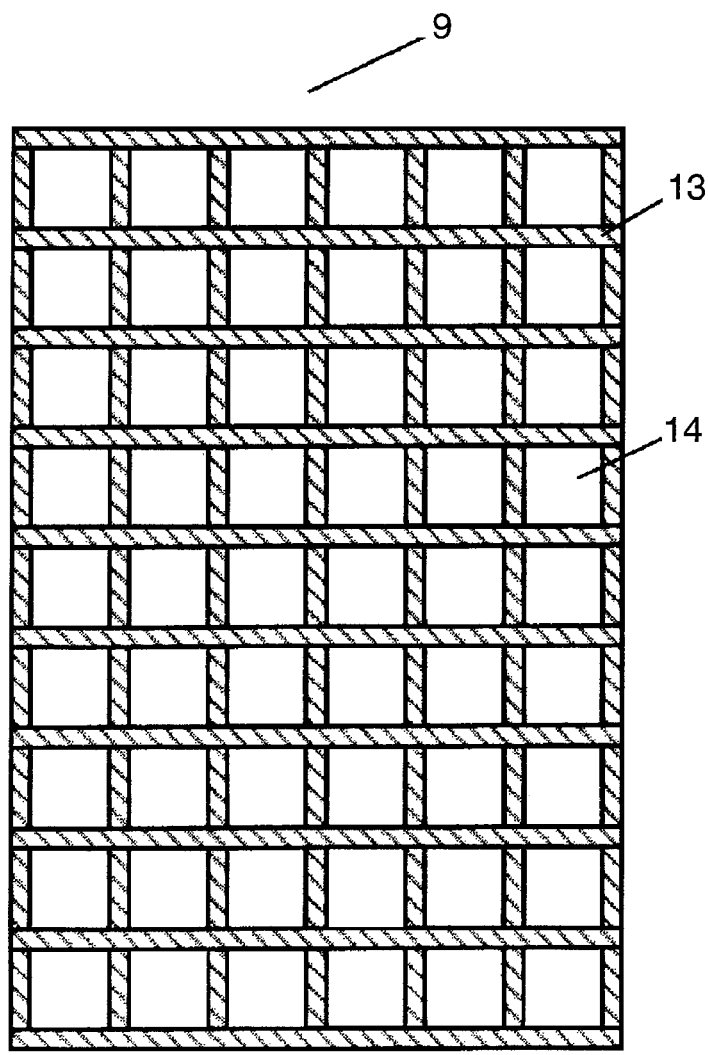
FIG. 2 shows a adhesive layer in embodiment 1 of the present invention.

Using FIGS. 1 and 2, embodiment 1 is explained.

Film 10 for suppressing conduction of radiation heat is structured by layers with resin film 11 having an IR absorptivity lower than 25% and IR-reflection layer 12 through adhesive 9, as shown in FIG. 1. Adhesive layer 9 is printed on at least one of resin film 11 and IR-reflection layer 12 such that bonding area 13 and non-bonding area 14 form a lattice pattern, as shown in FIG. 2.

The operation and function of film 10 for suppressing conduction of radiation heat thus structured is explained below.

Resin film 11 has a function to protect the IR-reflection layer from oxidational deteriorations and external impacts, thus contributing to sustaining the radiation-heat-conduction suppressing effect over a long term.

The IR, produced from a heat-generation source, transmits through resin film 11 and enters adhesive layer 9 at its bonding area 13 or non-bonding area 14.

At this time, the IR, entered at bonding area 13, is attenuated by the IR absorbing effect of the adhesive that structures bonding area 13. Meanwhile, the IR entered at non-bonding area 14 travels toward IR-reflection layer 12 without attenuation because of the absence of the adhesive, and reflects upon a surface of IR-reflection layer 12. The reflected IR again passes adhesive layer 9 at its bonding area 13 and non-bonding area 14, and transmits through resin film 11.

As in the above, the film 10 for suppressing conduction of radiation heat in this embodiment is partly applied with an adhesive into adhesive layer 9 having bonding area 13 and non-bonding area 14. In this manner, reduced is the ratio of IR absorption by adhesive layer 9.

As a result, because the IR transmitted through resin film 11 and reached IR-reflection layer 13 is effectively reflected, film 10 for suppressing conduction of radiation heat is allowed to exhibit an excellent IR-reflection effect.

Resin film 11 examples in this embodiment include an ETFE film (melting point 265° C., IR absorptivity 8%), an FEP film (melting point 270° C., IR absorptivity 8%), a PFA film (melting point 305° C., IR absorptivity 8%), a PPS film (melting point 285° C., IR absorptivity 10%), a non-oriented CPP film (melting point 170° C., IR absorptivity 17%) and a PET film (melting point 265° C., IR absorptivity 18%). Besides, a PSF film (continuous use temperature 150° C., IR absorptivity 10%) or a PES film (continuous use temperature 180° C., IR absorptivity 15%) are to be utilized as an example not having a definite melting point. Particularly, a fluorinated resin film or PPS film, having a low absorptivity in an IR wavelength range of 2 to 25 μm, is preferred because to effectively reflect IR upon IR-reflection layer 12.

IR-reflection layer 12 can use, say, a metal foil beat out of such a metal as aluminum, gold, silver, copper, nickel or stainless steel, or a metal-evaporation film that is evaporated of aluminum, gold, silver, copper or nickel. Of these, it is preferred to use an aluminum or copper foil that is high in IR reflectivity but low in processing cost.

The adhesive, for use in adhesive layer 9, can use an organic adhesive, e.g. polyurethane adhesive, epoxy adhesive, resorcinol-resin adhesive, phenol-resin adhesive or silicone-imide based adhesive, or an inorganic adhesive, e.g. water glass, ceramics or cement.

Between resin film 11 and IR-reflection layer 12, adhesive layer 9 is formed having bonding area 13 and non-bonding area 14.

As a method to form an adhesive layer 9 having bonding area 13 and non-bonding area 14, it is possible to use a printing technique such as gravure printing, offset printing, flexographic printing or screen printing, or etching with use of a solvent and light. Of these, it is preferred to use a printing technique inexpensive in processing cost.

Adhesive layer 9 may be formed on any of the surfaces, by taking account of physical properties, such as flexibility and tensile strength, of IR-reflection layer 12 and resin film 11.

Although the printing pattern of bonding area 13 was in the lattice form, it may use a geometrical pattern having a material of a triangle, a square, a diamond, a polygon, a circle or the like, or a non-geometrical pattern, e.g. design, in accordance with the use form of a film for suppressing conduction of radiation heat.

The area ratio between bonding area 13 and non-bonding area 14 can be freely changed depending upon a degree of bonding strength and IR reflection effect.

Although film 10 for suppressing conduction of radiation heat was layered double with using resin film 11 and IR-reflection layer 12 through adhesive layer 9, each of resin film 11 and IR-reflection layer 12 is not necessarily of a single layer.

For example, where there are heat sources on both sides of and sandwiching film 10 for suppressing conduction of radiation heat, resin films 11 are bonded on both surfaces of the IR-reflection layer 12 by adhesive layers 9. In this manner, film 10 for suppressing conduction of radiation heat is to reflect the IR caused from the heat sources and eliminate the influence of the IR produced from the heat source on the opposite side.

By fixing film 10 for suppressing conduction of radiation heat of this embodiment to a location where radiation-heat conduction is required to suppress, an effective heat insulation effect can be obtained.

The fixing location examples include every location requiring an insulation or shield of heat, say, building components such as residential or factory roofs and walls, information appliances such as computers, printers, copiers and projectors, cooking household appliances such as vacuum bottles, microwave ovens and water heaters, and semiconductor manufacturing equipment.

Embodiment 2

Figure 3:
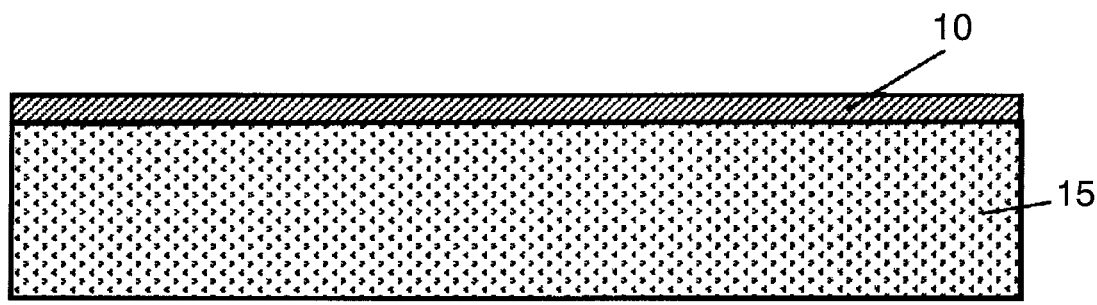
FIG. 3 is a cross-sectional view of a heat-insulating material in embodiment 2 of the present invention.
Figure 4:
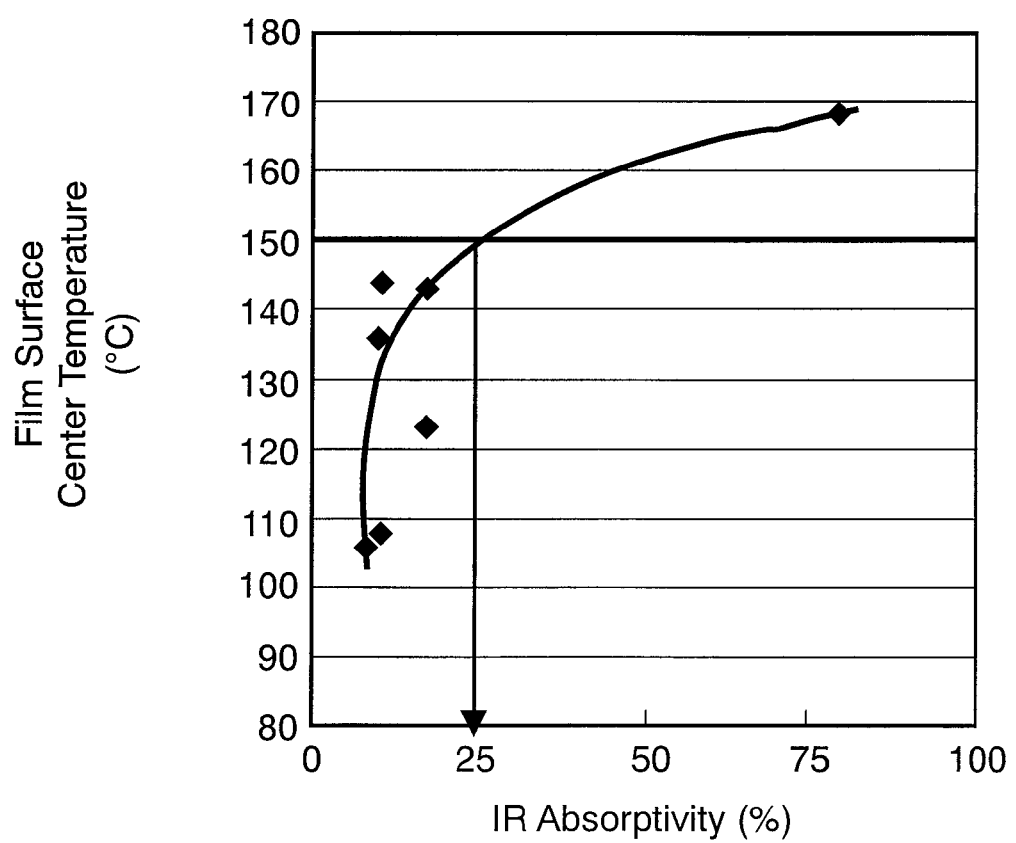
FIG. 4 is a figure showing a relationship between an IR absorptivity of a resin film and a surface center temperature of a film for suppressing conduction of radiation heat.

Using FIGS. 3 and 4, embodiment 2 is explained.

FIG. 3 is a sectional view of a heat insulating material in this embodiment.

Film 10 for suppressing conduction of radiation heat is provided on a heat insulating material 15, on its surface to experience higher temperature. Film 10 for suppressing conduction of radiation heat can make use of a similar structure to embodiment 1.

Heat insulating material 15 can use a foamed plastic heat insulating material, such as polystyrene foam, polyurethane foam and phenol foam, an inorganic heat insulating material such as glass wool, rock wool and glass powder, and a woody-fiber heat insulating material such as an insulation board and cellulose fiber. It is possible to use a vacuum heat insulating material that the material like the above is covered with an envelope material having a gas-barrier nature, to reduce the pressure at the inside thereof.

There is no especial limitation in the fixing way onto a heat insulating material, e.g. chemical bonding with an adhesive, fixing with nails and sewing are applicable. Of these, adhesive-based chemical bonding is preferred if considering applications to various heat insulating materials.

As for the heat insulating material structured as in the above, the results confirmed on the radiation-heat-conduction suppressing effects are shown in examples 1 to 6 and comparative examples 1 to 4 the when changing the type of the film for suppressing conduction of radiation heat.

In order to clarify the radiation heat conduction suppressing effect, this embodiment used, as a heat insulating material, a vacuum heat insulating material made by a glass wool board wherein the vacuum heat insulating material had a thickness of consistently 12 mm.

In capability evaluations, evaluation items were taken with a surface center temperature of a film for suppressing conduction of radiation heat when radiated with a halogen heater vertically of the surface of a glass-wool board having a thickness 12 mm and a center temperature, at a lower-temperature surface, of the glass-wool board.

For a reference of evaluation, a film for suppressing conduction of radiation heat was provided in a distance of from the halogen heater where the higher-side surface temperature of the glass-wool board was to attain 150° C. When the temperature of the film is 150° C. or lower, it was determined that there was a radiation-heat suppressing effect. The center temperature, at a lower-temperature surface, of the glass-wool board was 50° C.

EXAMPLE 1

An adhesive, of polyol (Mitsui Takeda Chemical's product name: Takelac A-310), polyisocyanate (Mitsui Takeda Chemical's product name: Takenate A-3) and ethyl acetate, was applied to one surface of a 15-μm nickel foil, as an IR-reflection layer, by use of gravure printing in a manner a bonding area and a non-bonding area to 50:50. Simultaneously, a 10-μm CPP film was laminated as a resin film over a surface of the adhesive. The film for suppressing conduction of radiation heat in this example had an IR reflectivity of 51% as measured.

Note that the adhesive is cured by a known method. It may be done at room temperature or with heating as required. Temperature is preferably in a range of 30 to 60° C. The adhesive layer is provided a thickness in a range not to spoil the adhesion function. It is preferably 5 μm or smaller, more preferably 3 μm or smaller.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 143° C. and 39° C. Confirmed were radiation heat conduction suppressing effects respectively of 7° C. and 11° C. as compared to the case not provided with such a film for suppressing conduction of radiation heat.

EXAMPLE 2

An adhesive was applied to one surface of a 12-μm aluminum foil as an IR-reflection layer, similarly to embodiment 1. Simultaneously, a 10-μm CPP film (having an IR absorptivity 17%) was laminated as a resin film over a surface of the adhesive. The film for suppressing conduction of radiation heat in this example had an IR reflectivity of 61% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 123° C. and 35° C. Confirmed were radiation-heat-conduction-suppressing effects respectively of 27° C. and 15° C. as compared to the case not provided with such a film for suppressing conduction of radiation heat.

EXAMPLE 3

An adhesive was applied to one surface of a 12-μm aluminum foil as an IR-reflection layer, similarly to embodiment 1. Simultaneously, a 25-μm FEP film (having an IR absorptivity 8%) was laminated as a resin film over a surface of the adhesive. The film for suppressing conduction of radiation heat in this example had an IR reflectivity of 84% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 106° C. and 33° C. Confirmed were radiation-heat-conduction-suppressing effects respectively of 43° C. and 17° C. as compared to the case not provided with such a film for suppressing conduction of radiation heat.

EXAMPLE 4

An adhesive was applied to one surface of a 12-μm aluminum foil as an IR-reflection layer, similarly to embodiment 1. Simultaneously, a 2-μm PPS film (having an IR absorptivity 10%) was laminated as a resin film over a surface of the adhesive. The film for suppressing conduction of radiation heat in this example had an infrared-ray reflectivity of 83% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 108° C. and 34° C. Confirmed were radiation heat conduction suppressing effects respectively of 42° C. and 16° C. as compared to the case not provided with such a film for suppressing conduction of radiation heat.

EXAMPLE 5

An adhesive was applied to an unevaporated surface of a 2-μm aluminum-evaporated PPS film as an IR-reflection layer, similarly to embodiment 1. Simultaneously, a 2-μm PPS film (having an IR absorptivity 10%) was laminated as a resin film over a surface of the adhesive. The film for suppressing conduction of radiation heat in this example had an IR reflectivity of 53% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 144° C. and 42° C. Confirmed were radiation-heat-conduction-suppressing effects respectively of 6° C. and 8° C. as compared to the case not provided with such a film for suppressing conduction of radiation heat.

EXAMPLE 6

An adhesive was applied to an unevaporated surface of a 2-μm aluminum-evaporated PPS film as an IR-reflection layer, similarly to embodiment 1. Simultaneously, an aluminum foil having a thickness 12 μm was laminated as an IR-reflection layer over a surface of the adhesive. Then, an adhesive is again applied to an evaporated surface of the laminated film by gravure printing to provide a bonding area and a non-bonding to 50:50.

Simultaneously, a 2-μm PPS film (having an IR absorptivity 10%) was laminated as a resin film over a surface of the adhesive. The film for suppressing conduction of radiation heat in this example had an IR reflectivity of 58% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 136° C. and 38° C. Confirmed were radiation-heat-conduction-suppressing effects respectively of 14° C. and 12° C. as compared to the case not provided with such a film for suppressing conduction of radiation heat.

COMPARATIVE EXAMPLE 1

Heat radiation was conducted to provide 150° C. of heat by a halogen heater to the surface of glass-wool board having a thickness 12 mm without providing a film for suppressing conduction of radiation heat. The center temperature, at a lower-temperature surface, of the glass-wool board was 50° C.

COMPARATIVE EXAMPLE 2

A 12-μm aluminum foil was provided, as it is, as an IR-reflection layer on the surface of a glass-wool board. The aluminum foil had an IR reflectivity of 95% wherein the surface center temperature of the aluminum foil and the center temperature, at a lower-temperature surface, of the glass-wool board were respectively 100° C. and 30° C.

Confirmed were radiation heat conduction suppressing effects respectively of 50° C. and 20° C., as compared to the case with no provision. However, elapsing 10 days after the use, confirmed were temperature rises in the film surface center temperature and in the center temperature, at a lower-temperature surface, of the glass-wool board, thus enabling to presume an IR absorption increase due to oxidational deterioration.

COMPARATIVE EXAMPLE 3

An adhesive was applied to one surface of a 12-μm aluminum foil as an IR-reflection layer, similarly to the example 1. Simultaneously, a 120-μm polyimide film (having an IR absorptivity 80%) was laminated as a resin film over the surface of the adhesive. The film for suppressing conduction of radiation heat in this example had an IR reflectivity of 20% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 168° C. and 54° C. Confirmed were temperature rises respectively of 18° C. and 4° C. as compared to the case with no provision. This can be considered because the polyimide film, as a resin film, had an IR absorptivity of 80% and hence the resin film absorbed IR.

COMPARATIVE EXAMPLE 4

An adhesive was applied to one surface of a 12-μm matte aluminum foil as an IR-reflection layer, similarly to the example 1. Simultaneously, a 10-μm CPP film (having an IR absorptivity 10%) was laminated as a resin film over a surface of the adhesive. The film for suppressing conduction of radiation heat in this example had an IR reflectivity of 42% as measured.

When the film for suppressing conduction of radiation heat was spread over the glass-wool board and evaluated, the surface center temperature of the film for suppressing conduction of radiation heat and the center temperature, at a lower-temperature surface, of the glass-wool board were respectively 155° C. and 53° C. Confirmed were temperature rises respectively of 5° C. and 3° C. as compared to the case with no provision. This can be considered because the matte aluminum foil, as the IR-reflection layer, had an IR reflectivity, as measured, of 45% and hence the IR-reflection layer could not fully reflect IR.

As for the film for suppressing conduction of radiation heat thus structured, there is shown, in Table 1, results of radiation-heat-conduction suppressing effects confirmed upon changing the type of the resin film and IR-reflection layer.

The core material 17 can use a foamed plastic heat insulating material such as polystyrene foam, polyurethane foam and phenol foam, or an inorganic heat insulating material such as glass wool, rock wool and a silica powder.

Thermal bonding layer 8 can use various resin films, e.g. CPP, OPP, OPET, PVDC, EVOH, PAN, PVA, PEN or CTFE, in accordance with the use temperature of vacuum heat insulating material 16.

From those, it is preferred to select a resin film excellent in gas-barrier nature and water-vapor-barrier properties. In this manner, reliability can be improved for the vacuum heat insulating material.

The film 10 for suppressing conduction of radiation heat can use a similar structure to embodiment 1.

TABLE 1

| | IR-reflection layer | Resin Film Name | IR Absorptivity % | RRSF IR Reflectivity % | Film-surface-center Temperature ° C. | Center temperature ° C. at Lower-temperature Surface | Evaluation Effect | Oxidational Deterioration |
|---|---|---|---|---|---|---|---|---|
| Example 1 | Ni Foil | CPP | 17 | 51 | 143 | 39 | Present | Absent |
| Example 2 | Al Foil | CPP | 17 | 61 | 123 | 35 | Absent | Absent |
| Example 3 | Al Foil | FEP | 8 | 84 | 106 | 33 | Present | Absent |
| Example 4 | Al Foil | PPS | 10 | 83 | 108 | 34 | Present | Absent |
| Example 5 | Al-evaporated PPS | PPS | 10 | 53 | 144 | 42 | Present | Absent |
| Example 6 | Al-evaporate PPS/Al Foil | PPS | 10 | 58 | 136 | 38 | Present | Absent |
| Comparative Example 1 | — | — | — | — | 150 | 50 | Absent | — |
| Comparative Example 2 | Al Foil | — | — | 95 | 100 | 30 | Present | Present |
| Comparative Example 3 | Al Foil | PI | 80 | 20 | 168 | 54 | Absent | Absent |
| Comparative Example 4 | Matte Al Foil | CPP | 10 | 42 | 155 | 53 | Absent | Absent |

PI: Polyimide resin
RRSF: Radiation-heat-conduction suppression film
PPS: Polyphenylene sulfide FIG. 4 shows a relationship between an IR absorptivity of the resin film and a surface center temperature of the film for suppressing conduction of radiation heat while FIG. 5 shows a relationship between an IR reflectivity of the film for suppressing conduction of radiation heat and a surface center temperature of the film for suppressing conduction of radiation heat.

It can be seen from FIG. 4 that the surface center temperature of the film for suppressing conduction of radiation heat takes 150° C. or lower where no film is provided, at an IR absorptivity of 25% or lower of the resin film.

Figure 5:
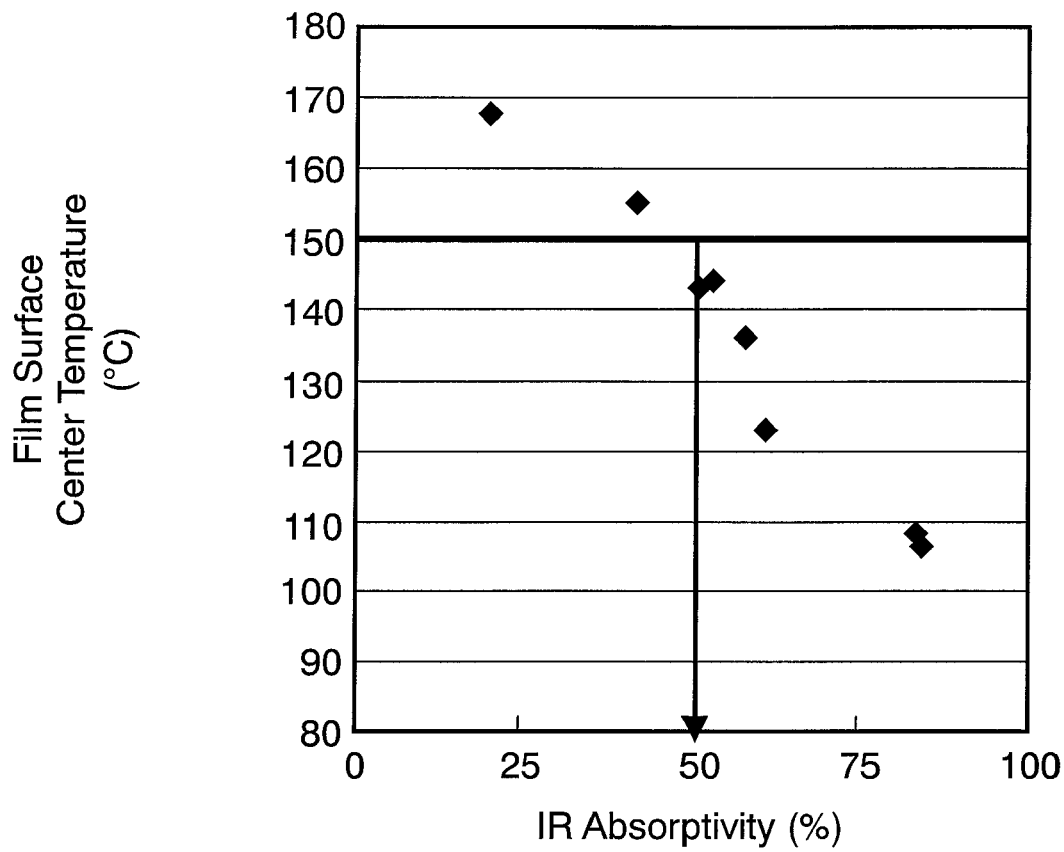
FIG. 5 is a figure showing a relationship between an IR absorptivity of a film for suppressing conduction of radiation heat and a surface center temperature of the film for suppressing conduction of radiation heat

Likewise, from FIG. 5, it can be seen that radiation-heat-conduction suppressing effect is obtained at an IR reflectivity of 50% or higher of the film for suppressing conduction of radiation heat.

Embodiment 3

Figure 6:
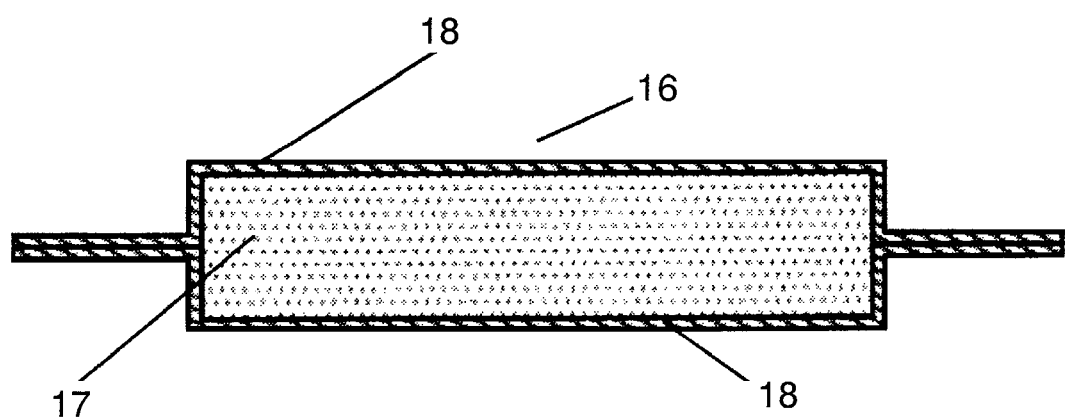
FIG. 6 is a cross-sectional view of a vacuum heat-insulating material in embodiment 3 of the present invention.
Figure 7:
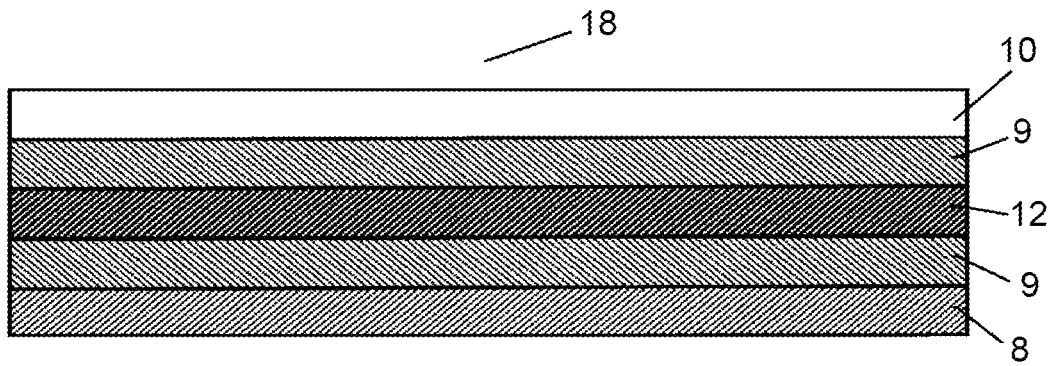
FIG. 7 is a cross-sectional view of an envelope member in embodiment 3 of the present invention.
Figure 8:
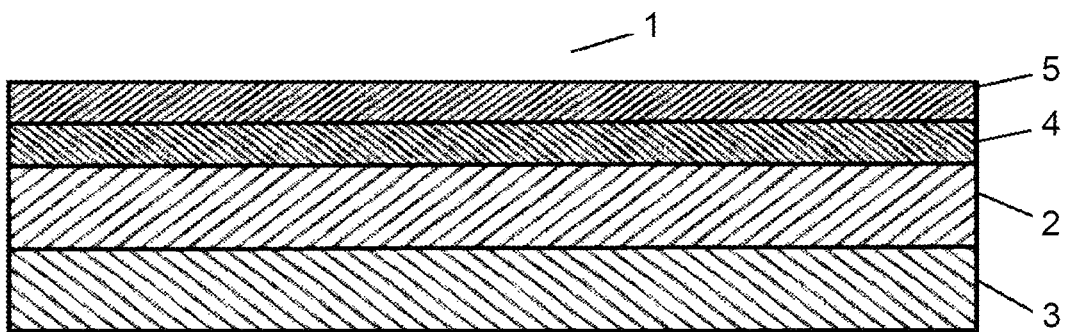
FIG. 8 is a cross-sectional view of a conventional heat-insulation film.
Figure 9:
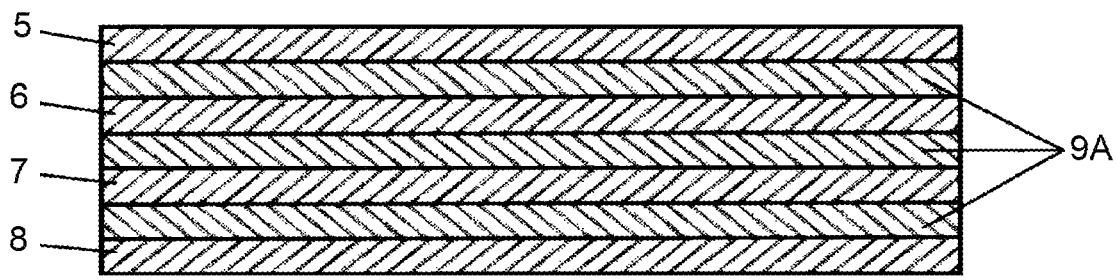
FIG. 9 is a cross-sectional view of a conventional heat-insulating lamination film.

Using FIGS. 6 and 7, embodiment 3 is explained.

As shown in FIG. 6, vacuum heat-insulating material 16 is made up with core material 17 and envelope material 18 covering core material 17, and structured to have an interior reduced in pressure.

In FIG. 7, envelope material 18 is structured with film 10 for suppressing conduction of radiation heat and thermal bonding layer 8.

Envelope material 18 is not necessarily an envelope material having a radiation-heat-conduction suppressing effect both in its higher-temperature-side and lower-temperature-side envelope materials. The envelope material obtains a sufficient effect where having a radiation-heat-conduction suppressing effect at least in the higher-temperature-side envelope material only directed toward a heat-generation source.

As for the vacuum heat-insulating material thus structured, there is shown in embodiment 7 the result confirmed on the radiation-heat-conduction suppressing effect where changing the type of the film for suppressing conduction of radiation heat while there is shown in comparative embodiment 5 a comparison therewith.

In order to clarify the radiation-heat-conduction suppressing effect, this embodiment uses, as a heat insulating material, a vacuum heat insulating material made of dry silica wherein the vacuum heat insulating material has a thickness consistently of 7 mm.

In capability evaluations, evaluation items were taken a surface center temperature of a film for suppressing conduction of radiation heat and a center temperature, at a lower-temperature surface, of the vacuum heat-insulating material, as radiated with a halogen heater vertically of the envelope material formed by a film for suppressing conduction of radiation heat.

EXAMPLE 7

An adhesive, similar to embodiment 1, was uniformly applied to one surface of a CPP thermal bonding layer having a thickness 50 μm, onto which was bonded an IR-reflection layer of a film for suppressing conduction of radiation heat as used in embodiment 1, thereby fabricating an envelope material having a radiation-heat-conduction suppressing effect.

Meanwhile, an adhesive, similar to embodiment 1, was uniformly applied to one surface of a CPP thermal bonding layer having a thickness 50 μm, onto which was bonded an IR-reflection layer of a film for suppressing conduction of radiation heat as used in embodiment 4, thereby fabricating an envelope material.

A core material of dry silica was covered with the two envelope materials to internally reduce the pressure, thereby fabricating a vacuum heat-insulating material. Radiation is made with a halogen heater to the envelope material formed by the film for suppressing conduction of radiation heat according to embodiment 1, of among the envelope materials of the vacuum heat-insulating materials. Thereupon, the vacuum heat-insulating material in this example had a center temperature, at a lower-temperature surface, of 33° C.

COMPARATIVE EXAMPLE 5

By inverting the vacuum heat-insulating material used in embodiment 7, radiation is made with a halogen heater to the envelope material formed by the film for suppressing conduction of radiation heat used the envelope material according to comparative example 4. Thereupon, the vacuum heat-insulating material in this example had a center temperature, at a lower-temperature surface, of 45° C.

In the above structure, the film double-layered with film 10 for suppressing conduction of radiation heat and thermosetting bonding layer 8 of a thermosetting resin by an adhesive 9, is used as an envelope material for a vacuum heat-insulating material. As a result, radiation heat conduction is suppressed by film 10 for suppressing conduction of radiation heat and further in-solid and in-gas heat conductions are suppressed by the vacuum heat-insulating material, thus enabling to exhibit an excellent heat insulation.

Embodiment 4

Figure 10:
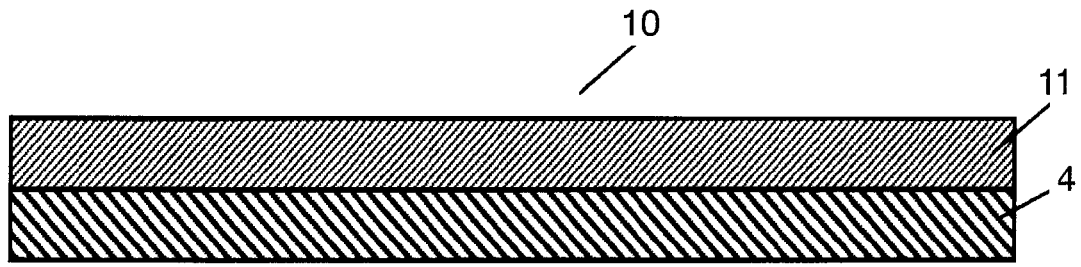
FIG. 10 is a cross-sectional view of a film for suppressing conduction of radiation heat in embodiment 4 of the present invention.

Using FIG. 10, embodiment 4 is explained.

In FIG. 10, film 10 for suppressing conduction of radiation heat is structured by layering resin film 11 having a melting point of 150° C. or higher and an IR absorption of lower than 25% and metal foil 4, thus possessing an IR reflectivity of 50% or higher.

The operation and function of film 10 for suppressing conduction of radiation heat thus structured is explained below.

Resin film 11 has a melting point of 150° C. or higher. In an environment at 150° C. or lower, it serves to prevent metal foil 4 from oxidizing without melting, thus sustaining a radiation-heat-conduction suppressing effect over a long term.

The IR, entered at a surface of resin film 11, reaches metal foil 4 at an absorption ratio of 25% or lower and reflects thereupon. The reflected IR is also allowed to transmit resin film 11 at an absorption ratio of 25% or lower. Thus, there is no possibility that the increase in the in-solid heat conductivity, due to the IR absorption in resin film 11, surpasses the IR reflection effect based on metal foil 7.

As in the above, in this embodiment, by providing resin film 11 with a melting point of 150° C. or higher and an IR absorptivity of lower than 25% and layering it with metal foil 4, film 10 for suppressing conduction of radiation heat is provided with an IR reflectivity of 50% or higher. As a result, there is less conversion of from radiation heat conduction into in-solid heat conduction due to the incidence and reflection IR absorption in resin film 11. The IR, transmitted resin film 11 and reached metal foil 4, is allowed to reflect effectively, thus exhibiting an excellent radiation-heat suppression.

The resin film in the invention can use a resin film having a melting point of 150° C. or higher and an IR absorptivity of lower than 25%. Even a material, not having a definite melting point, is also usable provided that it has a heat resistance of 150° C. or higher and an IR absorptivity of lower than 25%. The indicator in this case is for those having a continuous use temperature of 150° C. or higher under the UL746B regulation. The examples having melting points of 150° C. or higher include an ETFE film having a thickness 25 μm (melting point 265° C., IR absorptivity 8%), an FEP film having a thickness 25 μm (melting point 270° C., IR absorptivity 8%), a PFA film having a thickness 25 μm (melting point 305° C., IR absorptivity 8%), a PPS film having a thickness 2 μm (melting point 285° C., IR absorptivity 10%), a non-oriented CPP film having a thickness 10 μm (melting point 170° C., IR absorptivity 17%), and a PET film having a thickness 15 μm (melting point 258° C., IR absorptivity 18%). Meanwhile, concerning those not having definite melting points, applicable are a PSF film having a thickness 25 μm (continuous use temperature 150° C., IR absorptivity 10%), a PES film having a thickness 25 μm (continuous use temperature 180° C., IR absorptivity 15%) and the like.

Metal foil 4 in the invention can use those metals spread into foils, e.g., an aluminum foil, a copper foil, a nickel foil and a stainless steel foil.

Of those, the aluminum foil, having considerably high IR reflectiveness, is to exhibit an excellent radiation-heat suppression. In addition, it has a merit of being economical because of its broad industrial applications.

Resin film 11 in this embodiment can use a fluorinated resin film. The fluorinated resin film serves for comparatively less absorption at 2 to 25 μm lying in an IR wavelength region and further suppressing the heat absorption due to resin ingredients, thus enabling effective IR reflection at metal foil 4 surface. Excellent radiation-heat suppression can be exhibited. Because of having the property excellent in corrosion and chemical resistances together with heat resistance, high radiation-heat suppressing effects can be exhibited over a long term even under a severe use condition such as high humidity.

The fluorinated resin film is, say, an ETFE film, an FEP film, a PFA film or a CTFE film.

Resin film 11 in this embodiment can use a PPS film. The PPS film is comparatively less absorptive in the IR region, and furthermore significantly excellent in heat resistance. Accordingly, even under a high temperature condition, the film does not cause a softening and shrinkage. A high radiation-heat suppressing effect can be exhibited over a long term, also providing an excellent exterior appearance.

By fixing film 10 for suppressing conduction of radiation heat like above of the invention to a location where requiring to suppress against radiation-heat conduction, effective heat insulation is available. Application point examples include building components such as housing or factory roofs, computers and character printers, office machines such as copiers at their points requiring heat shield, i.e. include positions between a heat generator arranged in the main body and a toner or an interior precise component weak to heat. Fluorescent lamps etc. incorporating inverters can also employ it.

Embodiment 5

Figure 11:
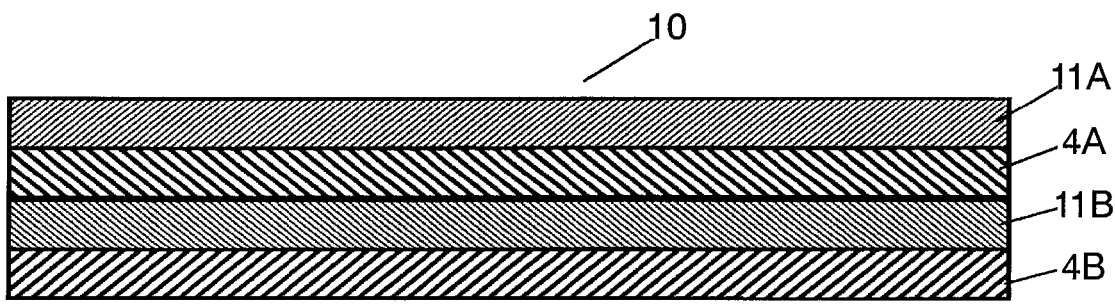
FIG. 11 is a cross-sectional view of a film for suppressing conduction of radiation heat in embodiment 5 of the present invention.

Using FIG. 11, embodiment 5 is explained.

In FIG. 11, film 10 for suppressing conduction of radiation heat is structured by alternate layers with a resin film 11A, 11B having a melting point of 150° C. or more and an IR absorptivity of lower than 25% and a metal foil 4A, 4B.

The operation and function of film 10 for suppressing conduction of radiation heat thus structured is explained.

In first metal foil 4 reached through transmitted first resin film 11A, IR reflection is to be acted upon similarly to embodiment 4. However, the IR in part, not reflected but absorbed and converted into in-solid heat conduction, is again emitted, to transmit second resin film 11B and reflect upon second metal foil 4B, thus exhibiting a further excellent radiation-heat suppression.

Embodiment 6

Figure 12:
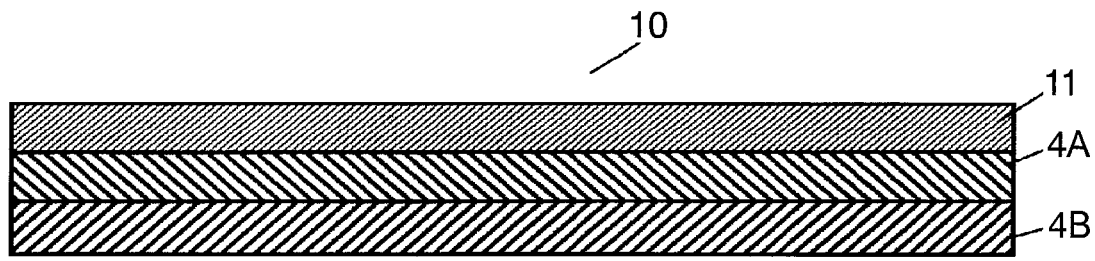
FIG. 12 is a cross-sectional view of a film for suppressing conduction of radiation heat in embodiment 6 of the present invention.

Using FIG. 12, embodiment 6 is explained.

In FIG. 12, film 10 for suppressing conduction of radiation heat is structured with resin film 11 having a melting point of 150° C. or higher and an IR absorptivity of lower than 25% and metal foil 4A, 4B layered thereon.

The operation and function of film 10 for suppressing conduction of radiation heat thus structured is explained.

In the first metal foil 4A reached through transmitted resin film 11, IR reflection is to be acted upon similarly to embodiment 4. However, the IR, not reflected but absorbed and converted into in-solid heat conduction, is again emitted and then reflected upon second metal foil 4B, thus exhibiting further excellent radiation-heat suppression.

Embodiment 7

Figure 13:
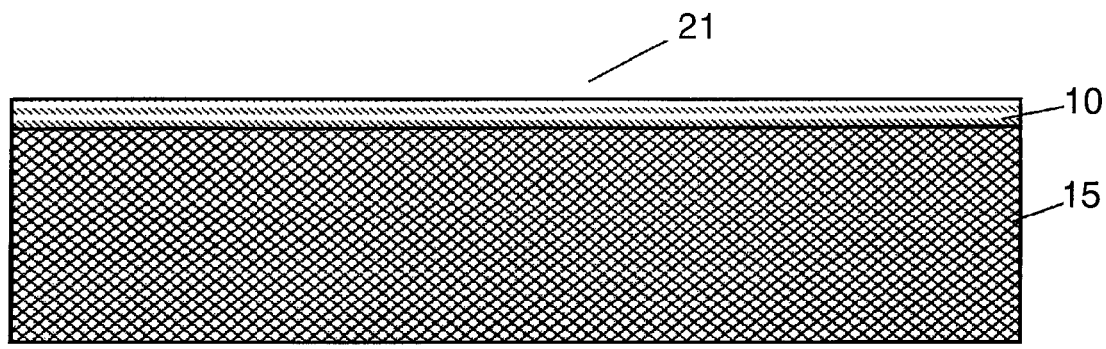
FIG. 13 is a cross-sectional view of a heat-insulating material whose film for suppressing conduction of radiation heat is put onto a surface of a heat insulating material in embodiment 7 of the present invention.

Using FIG. 13, embodiment 7 is explained.

In FIG. 13, heat-insulating material 21 is structured with film 10 for suppressing conduction of radiation heat and heat-insulating material 15.

In this structure, an excellent heat-insulation effect is to be exhibited by suppressing the radiation-heat conduction by means of film 10 for suppressing conduction of radiation heat and further suppressing in-solid and in-gas heat conductions by means of heat-insulating material 15.

Heat-insulating material 15, herein, uses one formed of an inorganic fiber, e.g. glass wool or rock wool, an inorganic solid body, e.g. firebrick or foamed ceramics, or an organic material, e.g. urethane foam or styrene foam, without especial limitations.

There is shown in embodiment 8 an evaluation result of the film for suppressing conduction of radiation heat of embodiment 7 set up on the surface of a urethane foam.

Capability evaluations were conducted by measuring a temperature at a radiated surface (higher-side temperature) and a temperature in a back surface (lower-side temperature) where heat radiation is made with a halogen heater that provides 143° C. of heat to a surface of a glass-wool board having a thickness 12 mm, to a similar glass-wool board provided with a film for suppressing conduction of radiation heat.

The lower-side temperature was 47° C. in the absence of the provision of a film for suppressing conduction of radiation heat.

EXAMPLE 8

The metal foil used an aluminum foil having a thickness 12 µm while the resin film used a PPS film having a thickness 2 µm. The PPS film has an IR absorptivity of 10% while the film for suppressing conduction of radiation heat in this embodiment has an IR reflectivity of 87%. The higher-side temperature was 96° C. and the lower-side temperature was 36° C. Confirmed were temperature decreases respectively of 47° C. and 11° C. as compared to the case with no provision, resulting in a determination that there is a radiation-heat-conduction suppressing effect.

Embodiment 8

Figure 14:
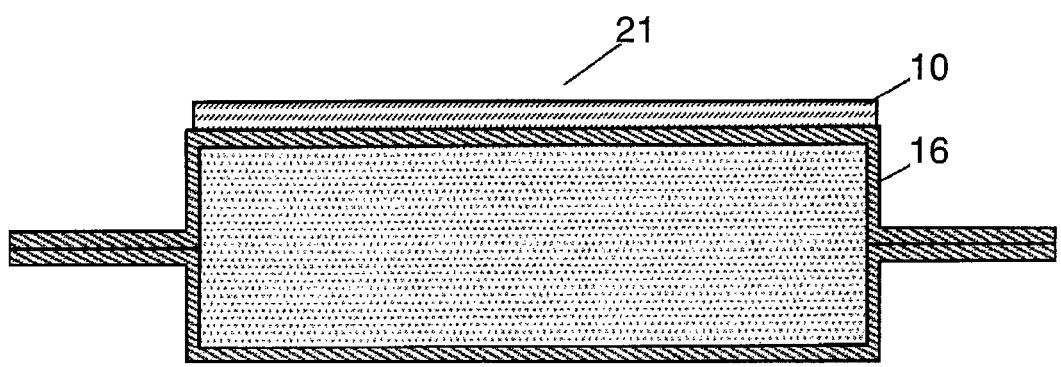
FIG. 14 is a cross-sectional view of a heat-insulating material whose film for suppressing conduction of radiation heat is put onto a surface of a vacuum heat-insulating material in embodiment 8 of the present invention.

Using FIG. 14, embodiment 8 is explained.

In FIG. 14, heat-insulating material 21 is structured with film 10 for suppressing conduction of radiation heat and vacuum heat-insulating material 16. Here, the vacuum heat-insulating material is made up with a core material and an envelope material, and manufactured by sealing the core material in the envelope material under reduced pressure. This is a heat-insulating material unlimitedly smaller in in-gas heat conductivity and hence excellent in heat-insulation capability.

In this structure, an excellent heat-insulation effect is to be exhibited by suppressing the radiation-heat conduction by means of film 10 for suppressing conduction of radiation heat and further in-solid and in-gas heat conductions by means of vacuum heat-insulating material 16.

Meanwhile, by fixing film 10 for suppressing conduction of radiation heat on a surface of vacuum heat-insulating material 16, there is a reduced amount of the heat that vacuum heat-insulating material 16 receives from a heat-generation source. Because the surface temperature lowers, it is possible to obtain an effect that suppresses the vacuum heat-insulating material from deteriorating by aging due to air intrusion through a seal opening.

There are shown, in embodiments 9 to 14, results of evaluations on the various films for suppressing conduction of radiation heat of embodiments 4 to 6 set up on the surfaces of the vacuum heat-insulating materials.

The vacuum heat-insulating material, used in this embodiment, used nylon and PET films for an exterior-material protection layer and an aluminum-foil matte surface for a gas barrier layer, and a non-oriented CPP film in a thermal bonding layer. The core material used a powder, of a uniform mixture of dry fumed silica added with 5 wt % of carbon black, sealed in a permeable non-woven fabric bag made into a thickness of 7 mm.

Capability evaluations were conducted by measuring the temperature at a radiated surface (higher-side temperature) and at a backside (lower-side temperature) where heat radiation is done to a vacuum heat-insulating material set up with a film for suppressing conduction of radiation heat, with a halogen heater that provides 150° C. of heat to a surface of the vacuum heat-insulating material. The lower-side temperature was 39° C. where there is no provision of a film for suppressing conduction of radiation heat. The resin film of a protection layer, in the comparative specification, had an IR absorptivity of 25% and an IR reflectivity of 30%.

The measurements of IR absorptivity and reflectivity were conducted similarly to embodiment 7.

EXAMPLE 9

A 15-μm-thick nickel foil was used as a metal foil while a 10-μm-thick non-oriented CPP film was used as a resin film. The CPP film has an IR absorptivity of 17% while the film for suppressing conduction of radiation heat in this example has an IR reflectivity of 52%. As a result of evaluation, the higher-side temperature was 140° C. while the lower-side temperature was 37° C. Confirmed were temperature decreases respectively of 10° C. and 2° C. as compared to the case with no provision, resulting in a determination that there is a radiation-heat-conduction suppressing effect.

EXAMPLE 10

A 12-μm-thick aluminum foil was used as a metal foil while a 10-μm-thick non-oriented CPP film was used as a resin film. The CPP film has an IR absorptivity of 17% while the film for suppressing conduction of radiation heat in this example has an IR reflectivity of 64%. As a result of evaluation, the higher-side temperature was 120° C. while the lower-side temperature was 33° C. Confirmed were temperature decreases respectively of 30° C. and 6° C. as compared to the case with no provision, resulting in a determination that there is a radiation-heat-conduction suppressing effect.

EXAMPLE 11

A 12-μm-thick aluminum foil was used as a metal foil while a 25-μm-thick FEP film (fluorinated film) was used as a resin film. The FEP film has an IR absorptivity of 8% while the film for suppressing conduction of radiation heat in this example has an IR reflectivity of 88%.

As a result of evaluation, the higher-side temperature was 103° C. while the lower-side temperature was 31° C. Confirmed were temperature decreases respectively of 47° C. and 8° C. as compared to the case with no provision, resulting in a determination that there is a radiation-heat-conduction suppressing effect. The fluorinated film in this example can use an ETFE film, a PFA film, a CTFE film or the like besides FEP.

EXAMPLE 12

A 12-μm-thick aluminum foil was used as a metal foil while a 2-μm-thick PPS film was used as a resin film. The PPS film has an IR absorptivity of 10% while the film for suppressing conduction of radiation heat in this example has an IR reflectivity of 87%. As a result of evaluation, the higher-side temperature was 103° C. while the lower-side temperature was 31° C. Confirmed were temperature decreases respectively of 47° C. and 8° C. as compared to the case with no provision, resulting in a determination that there is a radiation-heat-conduction suppressing effect.

EXAMPLE 13

A 12-μm-thick aluminum foil was used as a metal foil while a 2-μm-thick PPS film was used as a resin film. Layered were a PPS film, an aluminum foil, a PPS film and an aluminum foil, in the order of from the extreme surface. The PPS film has an IR absorptivity of 10% while the film for suppressing conduction of radiation heat in this example has an IR reflectivity of 90%.

As a result of evaluation, the higher-side temperature was 102° C. while the lower-side temperature was 30° C. Confirmed were temperature decreases respectively of 48° C. and 9° C. as compared to the case with no provision. Furthermore, from the fact that the temperature reducing effect was high as compared to example 12, it was determined that there is a further radiation-heat-conduction suppressing effect due to the alternate layers.

EXAMPLE 14

A 12-μm-thick aluminum foil was used as a metal foil while a 2-μm-thick PPS film was used as a resin film. Layered were a PPS film, an aluminum foil and an aluminum foil, in the order of from the extreme surface.

The PPS film has an IR absorptivity of 10% while the film for suppressing conduction of radiation heat in this example has an IR reflectivity of 90%. As a result of evaluation, the higher-side temperature was 103° C. while the lower-side temperature was 30.5° C. Confirmed were temperature decreases respectively of 47° C. and 8.5° C. as compared to the case with no provision. Furthermore, from the fact that the temperature reducing effect was high as compared to example 12, it was determined that there is a further radiation-heat-conduction suppressing effect due to the layers of metal foils.

The foregoing results based on embodiments 9 to 14 are shown in Table 2.

TABLE 2

| | Metal foil | Resin Film Name | IR Absorptivity % | Heat-shield Paint Absorptivity % | RRSF Reflectivity % | Surface Temperature° C. Higher Temperature | Lower Temperature | Oxidational Deterioration |
|---|---|---|---|---|---|---|---|---|
| Example 9 | Ni Foil | CPP | 17 | — | 52 | 140 | 37 | Absent |
| Example 10 | Al Foil | CPP | 17 | — | 64 | 120 | 33 | Absent |
| Example 11 | Al Foil | FEP | 8 | — | 88 | 103 | 31 | Absent |
| Example 12 | Al Foil | PPS | 10 | — | 87 | 103 | 31 | Absent |
| Example 13 | Al Foil | PPS | 10 | — | 90 | 102 | 30 | Absent |
| Example 14 | Al Foil | PPS | 10 | — | 90 | 103 | 30.5 | Absent |
| Comparative Example 7 | — | Absent | — | — | Absent | 150 | 39 | Absent |
| Comparative Example 8 | Al Foil | — | — | — | 95 | 100 | 30 | Present |
| Comparative Example 9 | Al Foil | — | — | 75 | 25 | 160 | 42 | Absent |
| Comparative Example 10 | Al Foil | PI | 80 | — | 20 | 165 | 43 | Absent |

TABLE 2-continued

| | Metal foil | Resin Film Name | Resin Film IR Absorptivity % | Heat-shield Paint Absorptivity % | RRSF Reflectivity % | Surface Temperature° C. Higher Temperature | Surface Temperature° C. Lower Temperature | Oxidational Deterioration |
|---|---|---|---|---|---|---|---|---|
| Comparative Example 11 | Matte Al Foil | CPP | 17 | — | 45 | 152 | 41 | Absent |

RRSF: Radiation-heat-conduction suppression film

Now, there are shown comparative examples to the film for suppressing conduction of radiation heat of the invention. The condition and way in the evaluation is similar to embodiment 7.

COMPARATIVE EXAMPLE 6

Heat radiation was conducted with a halogen heater, to provide 143° C. of heat to the surface of a glass-wool board having a thickness 12 mm without providing a film for suppressing conduction of radiation heat. The lower-side temperature at that time was 47° C.

COMPARATIVE EXAMPLE 7

Heat radiation was conducted with a halogen heater, to provide 150° C. of heat to the higher-temperature surface of a vacuum heat-insulating material as shown in embodiment 8 without setting up a film for suppressing conduction of radiation heat. The lower-side temperature at that time was 39° C. The resin film of the protection layer in the present comparative specification had an IR absorptivity of 25% and an IR reflectivity of 30%.

COMPARATIVE EXAMPLE 8

A 12-μm thick aluminum foil, as a metal foil, was set up on the surface of a vacuum heat-insulating material. The aluminum foil has an IR reflectivity of 95%. As a result of evaluation, initially the temperature, at the higher-temperature side, was 100° C. while the temperature, at the lower-temperature side, was 30° C. Confirmed were temperature decreases respectively of 50° C. and 9° C. as compared to the case with no provision. However, confirmed were gradual increases at the higher-temperature and lower-temperature sides before the passage of 10 days after the use. This can be considered as an IR absorption increase due to oxidational deterioration.

COMPARATIVE EXAMPLE 9

A 12-μm-thick aluminum foil was used as a metal foil, to set up the aluminum foil applied with a heat-shield paint onto the surface of a vacuum heat-insulating material.

The heat-shield paint had an IR absorptivity of 75% while the film for suppressing conduction of radiation heat in this comparative example had an IR reflectivity of 25%. As a result of evaluation, the higher-side temperature was 160° C. while the lower-side temperature was 42° C. Confirmed were temperature increases respectively of 5° C. and 3° C. as compared to the case with no provision, wherein it can be determined that there is no radiation-heat-conduction suppressing effect. This can be considered resulting from the fact that the paint is high in IR absorptivity and low in reflectivity.

COMPARATIVE EXAMPLE 10

A 12-μm-thick aluminum foil was used as a metal foil while a 120-μm-thick polyimide film was used as a resin film. The polyimide film has an IR absorptivity of 80% while the film for suppressing conduction of radiation heat in this comparative example has an IR reflectivity of 20%. As a result of evaluation, the higher-side temperature was 165° C. while the lower-side temperature was 43° C. Confirmed were temperature increases respectively of 15° C. and 4° C. as compared to the case with no provision, resulting in a determination that there is no radiation-heat-conduction suppressing effect. Because the polyimide film as a resin film had an IR absorptivity of 80%, no confirmation was made on a radiation-heat-conduction suppressing effect. Conversely, a temperature rise due to IR absorption was considered confirmed.

COMPARATIVE EXAMPLE 11

A 12-μm-thick matte aluminum foil was used as a metal foil while a 10-μm-thick non-oriented CPP film was used as a resin film.

The CPP film has an IR absorptivity of 17% while the film for suppressing conduction of radiation heat in this comparative example has an IR reflectivity of 45%. As a result of evaluation, the higher-side temperature was 152° C. while the lower-side temperature was 41° C. Confirmed were temperature increases respectively of 2° C. and 2° C. as compared to the case with no provision, resulting in a determination that there is no radiation-heat-conduction suppressing effect. It can be considered that, because the film for suppressing conduction of radiation heat had an IR reflectivity of 45%, no confirmation was made on a radiation-heat-conduction suppressing effect.

The results based on comparative examples 7 to 11 are shown in Table 2. Furthermore, there is shown in FIG. 15 a relationship between an IR absorptivity and a temperature at the higher-temperature side, as to examples 9 to 12 and comparative examples 7 to 11, while there is shown in FIG. 16 a relationship between an IR reflectivity and a higher-side temperature.

Figure 15:
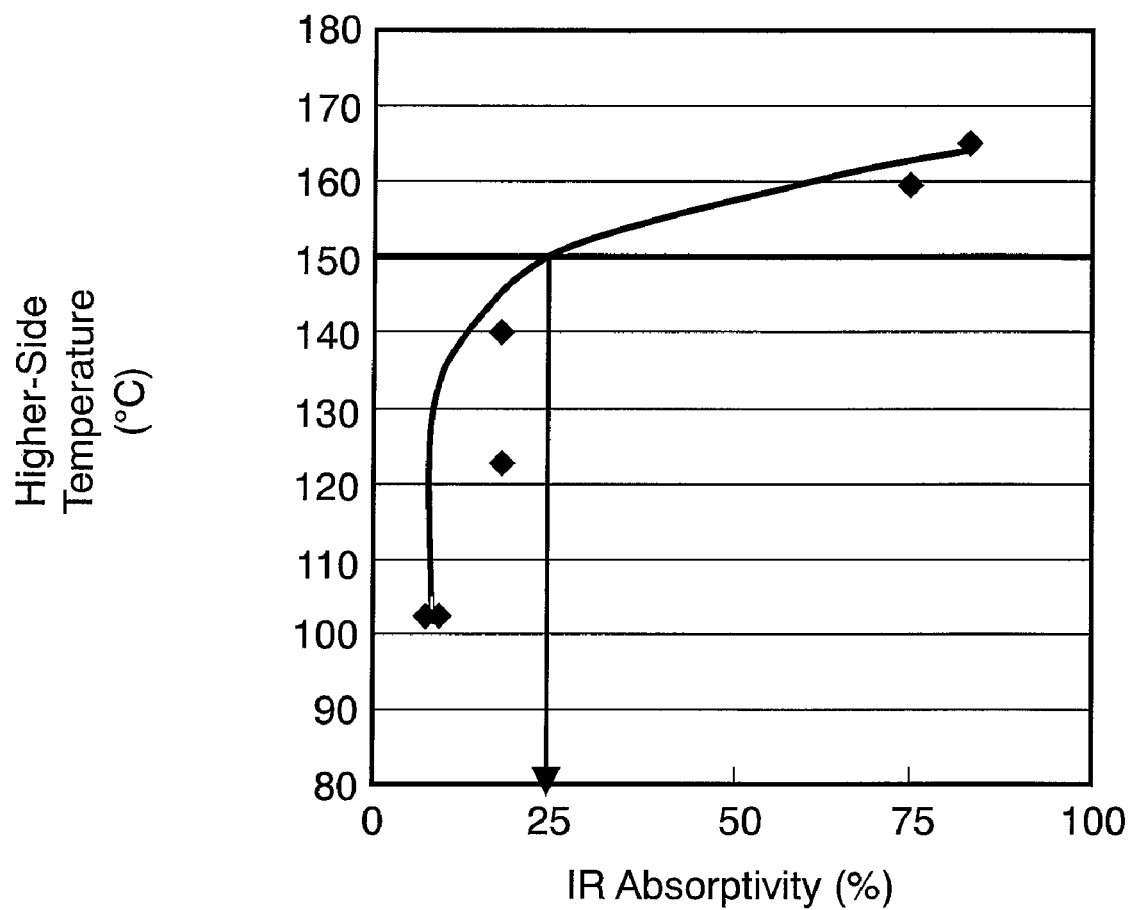
FIG. 15 is a characteristic figure showing a relationship between an IR absorptivity and a higher-side temperature.

From FIG. 15, it can be presumed that, at an IR absorptivity of lower than 25%, the higher-side temperature becomes lower than 150° C. where a film for suppressing conduction of radiation heat is not provided, to thereby exhibit an effect.

Figure 16:
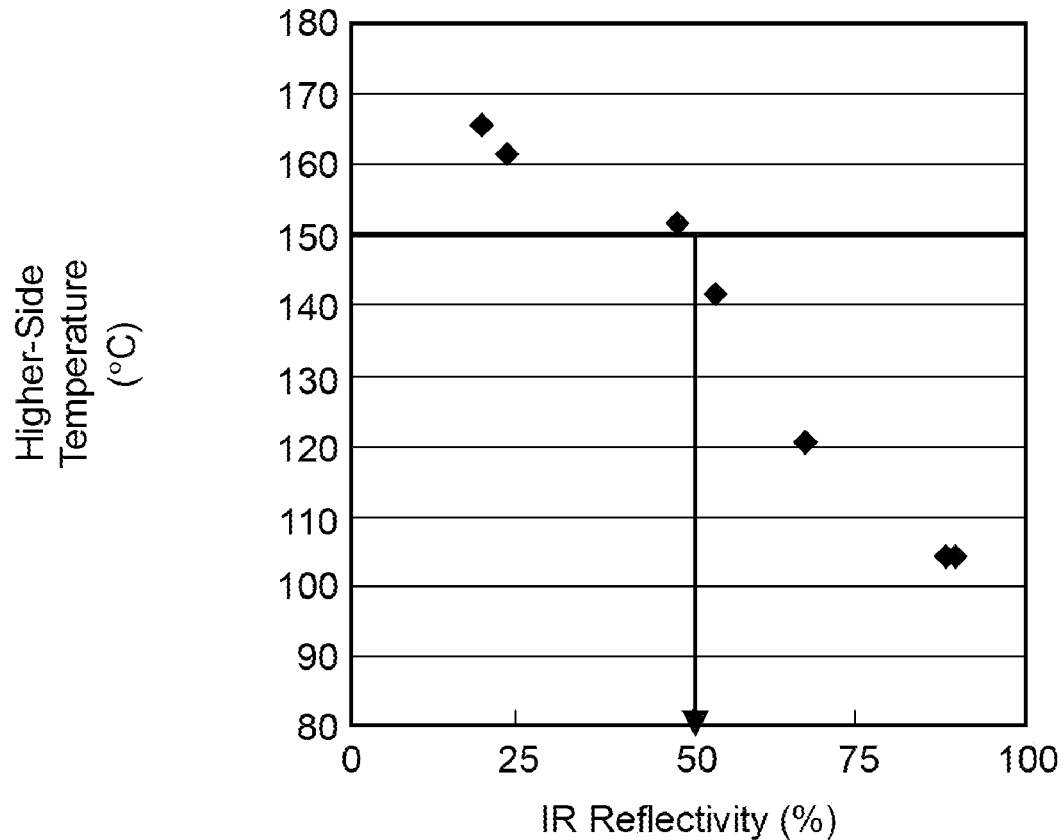
FIG. 16 is a characteristic figure showing a relationship between an IR reflectivity and a higher-side temperature.
Figure 17:
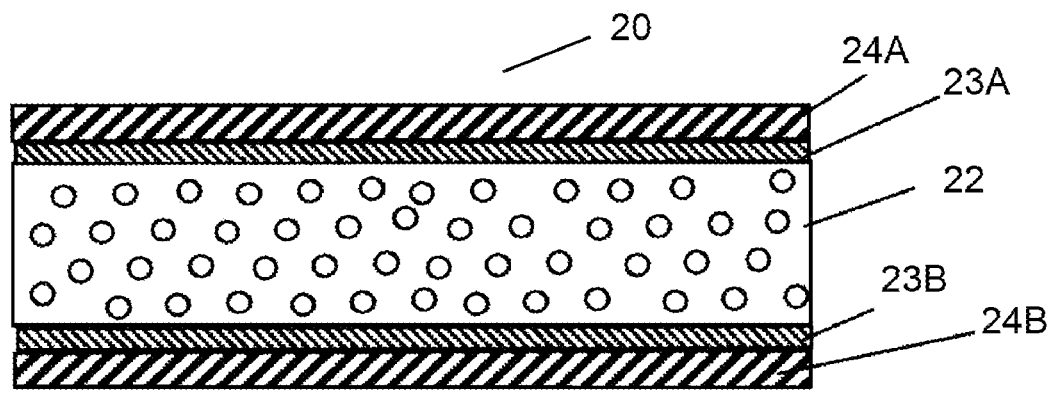
FIG. 17 is a cross-sectional view of a conventional heat-shield sheet.

Similarly from FIG. 16, it can be presumed that, at an IR reflectivity of 50% or higher, a radiation-heat-conduction suppressing effect is obtainable.

Note that how to layer the resin films and the metal foils is not limitative, i.e. those may be bonded by organic and inorganic adhesives, or may be bonded at ends by a physical way such as sewing.

The invention is characterized by alternate layers with resin films and metal foils, thereby exhibiting an excellent radiation-heat suppressing effect. Although the number of layers if greater is more effective, it is possible to select an optimal number of layers in accordance with application temperature and cost.

Furthermore, the invention is characterized with a resin film and a layered metal foil, thereby exhibiting an excellent radiation-heat suppressing effect. As compared to the alternate layers with resin films and metal foils, there is somewhat great influence of in-solid heat conduction due to contact between metal foils. This accordingly results in an inferior capability of radiation-heat suppression but is economical.

As described above, the film for suppressing conduction of radiation heat of the invention sustains the IR-reflecting capability over a long term and exhibits an excellent radiation-heat suppression.

In the film for suppressing conduction of radiation heat of the invention, by using a fluorinated resin film or a PPS film as a resin film, the IR reflection capability can be sustained over a long term even under the severe conditions in a high temperature range, thus exhibiting an excellent radiation-heat suppression.

Embodiment 9

Figure 18:
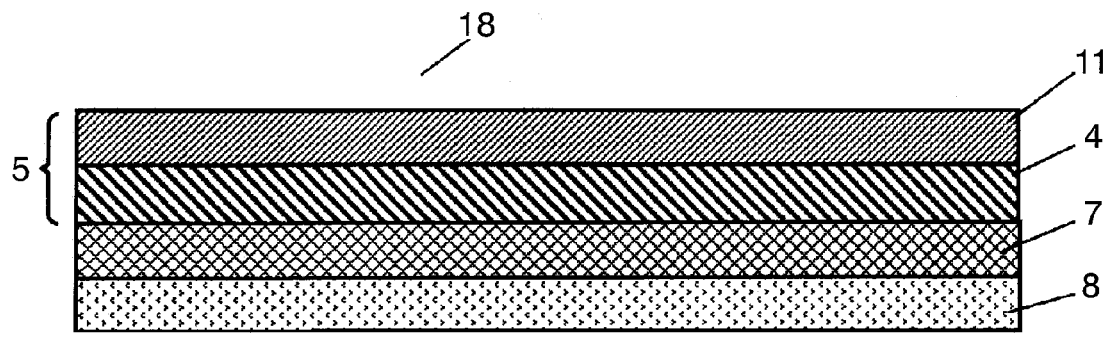
FIG. 18 is a cross-sectional view of an envelope material in embodiment 9.

Using FIG. 18, embodiment 9 is explained.

In FIG. 18, envelope material 18 is structured with protection layer 5, gas-barrier layer 7 and thermal bonding layer 8. Protection layer 5 is structured having an IR reflectivity of 50% or higher by layering resin film 11 having an IR absorptivity of lower than 25% and metal foil 4 together.

Resin film 11 serves to prevent against the oxidizing deterioration of metal foil 4, thus sustaining a radiation-heat-conduction suppressing effect over a long term.

The IR entered at a surface of resin film 11 reaches, at an absorptivity of lower than 25%, metal foil 4 and reflects thereupon. The reflected IR is allowed to transmit resin film 11 at an absorptivity of lower than 25% thereof. As a result, there is no possibility that the increase in the in-solid heat conductivity, due to the IR absorption in resin film 11, surpasses the IR reflection effect based on metal foil 4.

In this embodiment, resin film 11 is given an IR absorptivity of lower than 25% and layered with metal foil 4, thereby having an IR reflectivity of 50% or higher. As a result, there is less conversion, in resin film 11, of from radiational heat conduction into in-solid heat conduction due to incident and reflectional IR absorption. Because the IR, transmitted resin film 11 and reached metal foil 4, is reflected effectively, an excellent radiation-heat-conduction suppressivity can be exhibited.

Resin film 11 in the invention can use a resin film having an IR absorptivity of lower than 25%. Even materials, having a melting point of 150° C. or higher and those not having definite melting points, are desirably have heat resistance of 150° C. or higher. The indicator in this case is for those having a continuous use temperature of 150° C. or higher under the UL746B regulation.

The examples having melting points of 150° C. or higher include an ETFE film having a thickness 25 μm (melting point 265° C., IR absorptivity 8%), an FEP film having a thickness 25 μm (melting point 270° C., IR absorptivity 8%), a PFA film having a thickness 25 μm (melting point 305° C., IR absorptivity 8%), a PPS film having a thickness 2 μm (melting point 285° C., IR absorptivity 10%), a non-oriented CPP film having a thickness 10 μm (melting point 170° C., IR absorptivity 17%), and a PET film having a thickness 15 μm (melting point 258° C., IR absorptivity 18%). Meanwhile, concerning those not having definite melting points, applicable are a PSF film having a thickness 25 μm (continuous use temperature 150° C., IR absorptivity 10%), a PES film having a thickness 25 μm (continuous use temperature 180° C., IR absorptivity 15%) and the like.

Metal foil 4 in the invention can use those metals spread into foils, e.g., an aluminum foil, a copper foil, a nickel foil and a stainless steel foil.

In this embodiment, by providing metal foil 4 as an aluminum foil, the aluminum foil among metals has a very high IR reflectionality, thus exhibiting an excellent radiation-heat-conduction suppressivity. In addition, it has a merit of being economical because of its broad industrial applications.

Resin film 11 in this embodiment, if provided as a fluorinated resin film, serves for comparatively less absorption at 2-25 μm lying in an IR wavelength region and further suppressing resin-ingredient-based heat absorption, thus enabling effective IR reflection at metal foil 4 surface.

As a result, excellent radiation-heat-conduction suppression can be exhibited.

Because of having the property excellent in corrosion and chemical resistances in addition to heat resistance, high radiation-heat-conduction suppressing effects can be exhibited over a long term even under a severe use condition such as high humidity.

The fluorinated resin film is, say, an ETFE film, an FEP film, a PFA film or a CTFE film.

By providing resin film 11 of this embodiment as a PPS film, the PPS film is comparatively less absorptive in the IR region and furthermore significantly excellent in heat resistance. Accordingly, even under a high temperature condition, the film does not cause a softening and shrinkage.

As a result, a high radiation-heat-conduction suppressing effect can be exhibited over a long term, also providing an excellence in exterior appearance.

The vacuum heat-insulating material, having the foregoing envelope material 18, is to suppress against radiation-heat conduction by its protection layer and to suppress in-gas and in-solid conductions by the vacuum heat-insulating material, thus having a significantly excellent heat-insulation capability.

Embodiment 10

Figure 19:
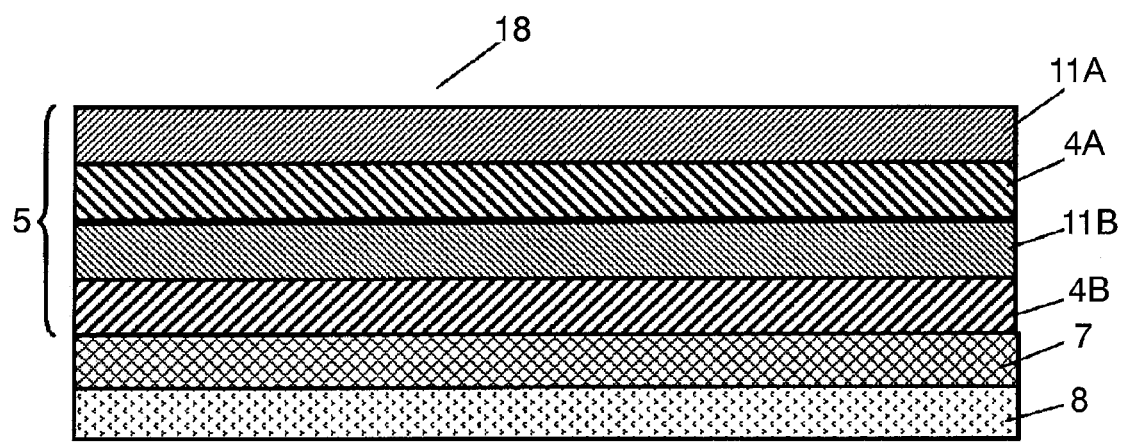
FIG. 19 is a cross-sectional view of an envelope material in embodiment 10.

Using FIG. 19, embodiment 10 is explained.

As shown in FIG. 19, envelope material 18 is structured with protection layer 5, gas-barrier layer 7 and thermal bonding layer 8. Protection layer 5 is structured with alternate layers with resin film 11A, 11B having an IR absorptivity of lower than 25% and metal foil 4A, 4B.

In first metal foil 4A where reached through transmitted the first resin film 11, an IR reflection is acted upon similarly to embodiment 9. However, part of the IR, not reflected but absorbed and converted into in-solid heat conduction, is again emitted to transmit through second resin film 11B and further reflect upon second metal foil 4B. As a result, a further excellent radiation-heat-conduction suppressivity can be exhibited.

Embodiment 11

Figure 20:
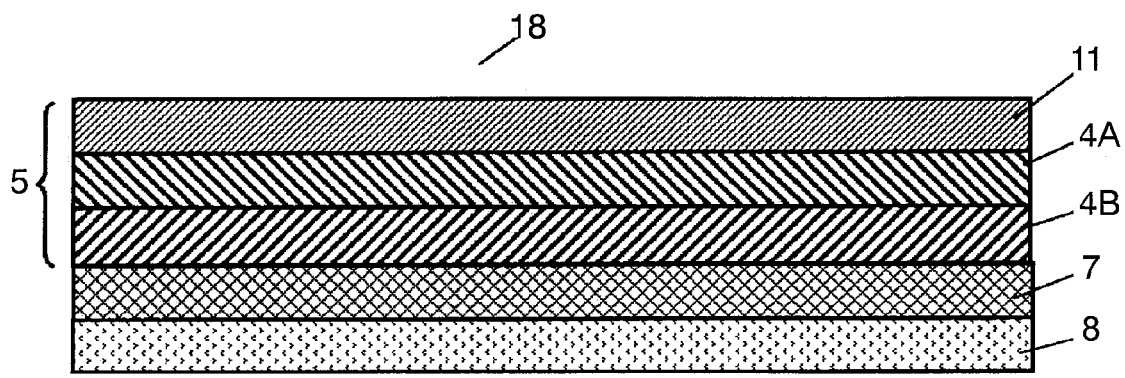
FIG. 20 is a cross-sectional view of an envelope material in embodiment 11.

Using FIG. 20, embodiment 11 is explained.

As shown in FIG. 20, envelope material 18 is structured with protection layer 5, gas-barrier layer 7 and thermal bonding layer 8. Protection layer 5 is structured with resin film 11 having an IR absorptivity of lower than 25% and metal foils 4A, 4B layered.

In first metal foil 4A where reached through transmitted resin film 11, an IR reflection is acted upon similarly to embodiment 9. However, part of the IR, not reflected but absorbed and converted into in-solid heat conduction, is again emitted and reflected by second metal foil 4B. As a result, a further excellent radiation-heat-conduction suppressivity can be exhibited.

Embodiment 12

Figure 21:
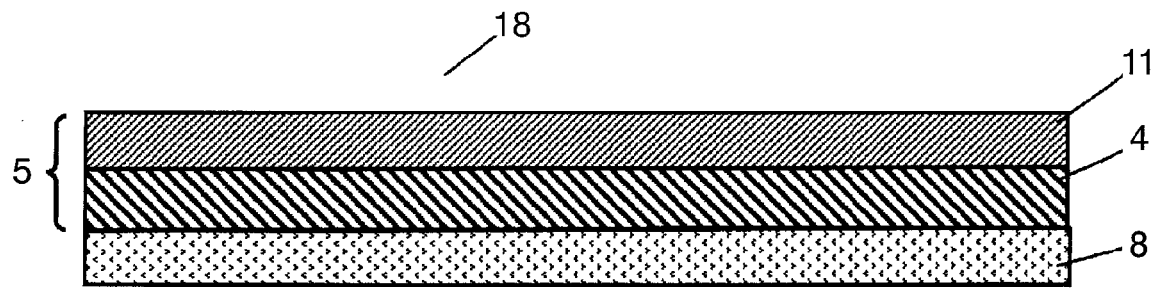
FIG. 21 is a cross-sectional view of an envelope material in embodiment 12.

Using FIG. 21, embodiment 12 is explained.

As shown in FIG. 21, envelope material 18 is structured with protection layer 5 and thermal bonding layer 8. Metal foil 4 of protection layer 5 is made as a gas-barrier layer, in which structure the existing gas-barrier layer 7 does not exist.

Due to this structure, because metal foil 4 in protection layer 5 has also a gas-barrier function, gas barrier layer 7 can be omitted.

As a result, it is possible to reduce material cost and manufacture-process cost.

Embodiment 13

Figure 22:
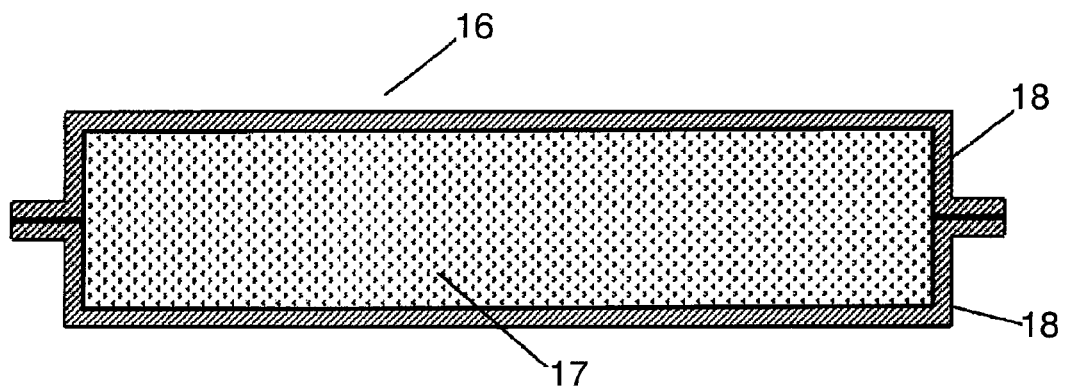
FIG. 22 is a cross-sectional view of a vacuum heat-insulating material in embodiment 13.

Using FIG. 22, embodiment 13 is explained.

As shown in FIG. 22, vacuum heat-insulating material 16 is structured with core material 17 and envelope material 18. This heat-insulating material is made by encapsulating core material 17 in envelope material 18 under reduced pressure, to have an in-gas heat conductivity unlimitedly low, thus being excellent in heat-insulation capability. Envelope material 18 is structured with protection layer 5, gas-barrier layer 7 and thermal bonding layer 8.

In the above structure, by suppressing radiation-heat conduction by means of protection layer 5 of envelope material 18 and, further, in-solid and in-gas heat conductions by means of vacuum heat-insulating material 16, an excellent heat-insulation effect can be exhibited.

Because the IR reflection effect of the protection layer 5 reduces the heat to be received by vacuum heat-insulating material 16 from a heart-generation source, to thereby lower the surface temperature thereof. This enables the use even in a high-temperature range where application is conventionally difficult.

Because of preventing the heat conductivity increase due to dependence upon temperature, an excellent heat-insulation capability can be obtained. Meanwhile, the lowering of the surface temperature contributes to suppressing the vacuum heat-insulating material from deteriorating, by aging, due to the air introduction through the seal opening, thus providing a high heat-insulation capability over a long term.

There are shown, in embodiments 15 to 18, results of confirmations made by changing the type of resin film 11 of protection layer 5 and metal foil 4.

In the vacuum heat-insulating material of embodiment 15-18, the core material uses a powder, of a uniform mixture of dry fumed silica added with 5 wt % of carbon black, sealed in a permeable non-woven fabric bag.

The thermal bonding layer of the envelope material used a non-oriented CPP film while the gas-barrier layer used a matte surface of an aluminum foil. The protection layer of the envelope material used the examples 1 to 4 structure, to fabricate a 7-mm-thick vacuum heat-insulating material.

Capability evaluations were conducted by measuring the temperatures, at higher-temperature and lower-temperature sides, of each vacuum heat-insulating material of this example radiated with heat of from a halogen heater that is to give 150° C. of heat to a surface, at the higher-temperature side, of a vacuum heat-insulating material structured similar to examples 1 to 4 except for using a nylon film and PET film in the protection layer. The resin film of the protection layer in this comparative specification had an IR absorptivity of 25%, an IR reflectivity of 30% and a lower surface temperature of 39° C.

The results on embodiments 15-18 are summarized in Table 3.

TABLE 3

| | | Resin Film | | Protection | Surface Temperature° C. | | |
|---|---|---|---|---|---|---|---|
| | Metal foil | Name | IR Absorptivity | layer Reflectivity % | Higher Temperature | Lower Temperature | Oxidational Deterioration |
| Example 15 | Ni Foil | CPP | 17% | 50 | 145 | 38 | Absent |
| Example 16 | Al Foil | CPP | 17% | 60 | 125 | 35 | Absent |
| Example 17 | Al Foil | FEP | 8% | 83 | 108 | 33 | Absent |
| Example 18 | Al Foil | PPS | 10% | 82 | 108 | 33 | Absent |
| Example 19 | Al Foil | PPS | 10% | 85 | 107 | 32 | Absent |
| Example 20 | Al Foil | PPS | 10% | 85 | 108 | 32.5 | Absent |
| Example 21 | Al Foil | PPS | 10% | 82 | 108 | 33 | Absent |
| Example 22 | Al Foil | PPS | 10% | 82 | 108 | 29.5 | Absent |
| Comparative Example 12 | Absent | Ny, PET | 25% | 30 | 150 | 39 | Absent |
| Comparative Example 13 | Al Foil | Absent | — | 95 | 100 | 31 | Present |
| Comparative Example 14 | Al Foil | PI | 80% | 20 | 170 | 45 | Absent |
| Comparative Example 15 | Matte Al Foil | CPP | 17% | 45 | 157 | 43 | Absent |

PI: Polyimide resin
Ny: Nylon

EXAMPLE 15

A 15-μm-thick nickel foil at its polished surface was used as a metal foil while a 10-μm-thick non-oriented CPP film was used as a resin film.

The CPP film had an IR absorptivity of 17% while the vacuum heat-insulating material in this example had an IR reflectivity of 50% at its surface (protection layer).

As a result of evaluation, the higher-side temperature was 145° C. while the lower-side temperature was 38° C. Confirmed were temperature decreases respectively of 5° C. and 1° C. as compared to the case with no provision, resulting in a determination that there is a radiation-heat-conduction suppressing effect.

EXAMPLE 16

A 12-μm-thick aluminum foil at its polished surface was used as a metal foil while a 10-μm-thick non-oriented CPP film was used as a resin film.

The CPP film had an IR absorptivity of 17% while the vacuum heat-insulating material in this example had an IR reflectivity of 60% at its surface (protection layer). As a result of evaluation, the higher-side temperature was 125° C. while the lower-side temperature was 35° C.

Confirmed were temperature decreases respectively of 25° C. and 4° C. as compared to the case with no provision, resulting in a determination that there is a radiation-heat-conduction suppressing effect.

EXAMPLE 17

A 12-μm-thick aluminum foil at its polished surface was used as a metal foil while a 25-μm-thick FEP film, that is a fluorinated film, was used as a resin film. The FEP film had an IR absorptivity of 8% while the vacuum heat-insulating material in this example had a surface having an IR reflectivity of 83%.

As a result of evaluation, the higher-side temperature was 108° C. while the lower-side temperature was 33° C. Confirmed were temperature decreases respectively of 42° C. and 6° C. as compared to the case with no provision, resulting in a determination that there is a radiation-heat-conduction suppressing effect.

The fluorinated film in the invention can use, besides an FEP film, an ETFE film, a PFA film, a CTFE film or the like.

EXAMPLE 18

A 12-μm-thick aluminum foil was used as a metal foil while a 2-μm-thick PPS film was used as a resin film. The PPS film had an IR absorptivity of 10% while the vacuum heat-insulating material in this example had an IR reflectivity of 82% at its surface. As a result of evaluation, the higher-side temperature was 108° C. while the lower-side temperature was 33° C. Confirmed were temperature decreases respectively of 42° C. and 6° C. as compared to the case with no provision, resulting in a determination that there is a radiation-heat-conduction suppressing effect.

Embodiment 14

Embodiment 14 explains vacuum heat-insulating material 16 using envelope material 18 of embodiment 10. The envelope material based on embodiment 14 has a thermal bonding layer, a gas-barrier layer and a core material that are similar in specification to embodiment 13.

Note that the figure is similar to FIG. 22 and hence omitted.

EXAMPLE 19

A 12-μm-thick aluminum foil was used as a metal foil for the protection layer while a 2-μm-thick PPS film was used as a resin film. Layered were a PPS film, an aluminum foil, a PPS film and an aluminum foil, in the order of from the extreme surface. The PPS film had an IR absorptivity of 10% while the film for suppressing conduction of radiation heat in this example had an IR reflectivity of 85%.

As a result of evaluation, the higher-side temperature was 107° C. while the lower-side temperature was 32° C. Confirmed were temperature decreases respectively of 43° C. and 7° C. as compared to the case with no provision. Furthermore, from the fact that the temperature reducing effect was high as compared to example 18, it was determined that there is a further radiation-heat-conduction suppressing effect due to the alternate layers.

Embodiment 15

Embodiment 15 explains vacuum heat-insulating material 16 using envelope material 18 of embodiment 11. The envelope material in embodiment 15 has a thermal bonding layer, a gas-barrier layer and a core material that are similar in specification to embodiment 13.

Note that the figure is similar to FIG. 22 and hence omitted.

EXAMPLE 20

A 12-μm-thick aluminum foil was used as a metal foil for a protection layer while a 2-μm-thick PPS film was used as a resin film. Layered were a PPS film, an aluminum foil and an aluminum foil, in the order of from the extreme surface. The PPS film had an IR absorptivity of 10% while the film for suppressing conduction of radiation heat in this example had an IR reflectivity of 85%. As a result of evaluation, the higher-side temperature was 108° C. while the lower-side temperature was 32.5° C. Confirmed were temperature decreases respectively of 42° C. and 6.5° C. as compared to the case with no provision. Furthermore, from the fact that the temperature reducing effect was somewhat high as compared to example 18, it was determined that there is a further radiation-heat-conduction suppressing effect due to the metal-foil layer.

Embodiment 16

Embodiment 16 explains embodiment-15 vacuum heat-insulating material 16 using embodiment-12 envelope material 18. This is shown in example 21. The core material in example 21 was given a specification similar to embodiment 13.

Note that the figure is similar to FIG. 22 and hence omitted.

EXAMPLE 21

A non-oriented CPP film was used for a thermal bonding layer. No gas-barrier layer was provided because a metal foil in a protection layer acts as a gas-barrier layer.

A 12-μm-thick aluminum foil at its polished surface was used as a metal foil for the protection layer while a 2-μm-thick PPS film was used as a resin film.

The PPS film had an IR absorptivity of 10% while the vacuum heat-insulating material in this example had an IR reflectivity of 82%. The higher-side temperature was 108° C. while the lower-side temperature was 33° C.

Confirmed were temperature decreases respectively of 42° C. and 6° C. as compared to the case with no provision, resulting in a determination that there is a radiation-heat-conduction suppressing effect.

There was caused no especial problem by providing the gas-barrier layer as a metal foil for the protection layer.

Embodiment 17

Figure 23:
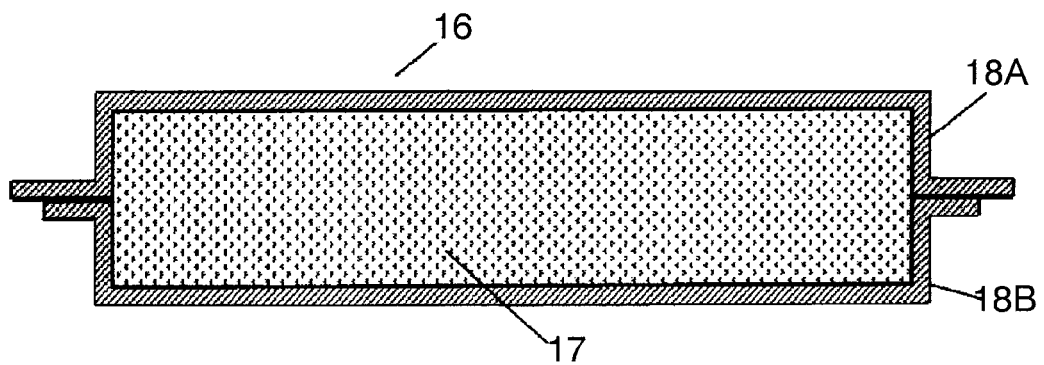
FIG. 23 is a cross-sectional view of a vacuum heat-insulating material in embodiment 17.

Using FIG. 23, embodiment 17 is explained.

This is characterized in that, when vacuum heat-insulating material 16 is provided, envelope material 18A having a surface positioned on the higher-temperature side is greater in size than envelope material 18B on the lower-temperature side. With this structure, the envelope material whose surface is positioned on the higher-temperature side is provided with a protection layer 5 having a radiation-heat-conduction suppressivity, thus having an effect to lower the surface temperature. By size-increasing the surface, provided is an effect to reduce the heat conduction to thermal boding layer 8 and lower-temperature-side envelope material.

As a result, thermal bonding layer 8 is suppressed from deteriorating, also improving the heat-insulation effect. This embodiment is further detailed in example 22.

Envelope material 18 in example 22 was given a specification for thermal bonding layer 8, gas-barrier layer 7 and core material that is similar to embodiment 13.

EXAMPLE 22

A 12-μm-thick aluminum foil was used as a metal foil for a protection layer while a 2-μm-thick PPS film was used as a resin film.

The PPS film had an IR absorptivity of 10% while the film for suppressing conduction of radiation heat in this example had an IR reflectivity of 82%.

As a result of evaluation, the higher-side temperature was 108° C. while the lower-side temperature was 29.5° C. Confirmed were temperature decreases respectively of 42° C. and 9.5° C. as compared to the case with no provision. Particularly, temperature decrease was great in the lower-side temperature. From this, it was determined that a further radiation-heat-conduction suppressing effect is obtainable by size-increasing the envelope material on the higher-temperature side.

The fact, the envelope material having a surface positioned on the higher-temperature side is greater in size than the envelope material on the lower-temperature side, refers to a status that, provided that the envelope material is polygonal in form, the total length of the sides thereof is longer on the high-temperature side than on the lower-temperature side thus being afford to completely cover the lower-temperature side. It signifies that, where the envelope material is circular in form, the diameter thereof is in a status longer on the higher-temperature side than on the lower-temperature side, wherein the lower-temperature side can afford to be completely covered. Namely, it signifies that, for any form of an envelope material, the higher-temperature side envelope material is in a status that can afford to completely cover the lower-temperature side envelope material.

The results on examples 15 to 22 are shown in Table 3.

In the above structure, an excellent heat-insulation effect is to be exhibited by suppressing the radiation-heat conduction by means of a protection layer having radiation-heat-conduction suppressivity and further in-solid and in-gas heat conductions by means of vacuum heat-insulating material 16.

Next, shown are comparative examples to the film for suppressing conduction of radiation heat of the invention. The condition and way of evaluations conforms to the example, wherein evaluation results are shown in Table 3 similarly.

COMPARATIVE EXAMPLE 12

A comparative example is shown in the case of using a protection layer not having a radiation-heat conduction suppressivity. Evaluation was conducted similarly to embodiment 13, on a vacuum heat-insulating material using an envelope material made by use of nylon and PET films for a protection layer, an aluminum foil matte surface for a gas-barrier layer and a non-oriented CCP for a thermal bonding layer. The core material was similar in specification to embodiment 13 while the vacuum heat-insulating material had equivalently a thickness 7 mm. The resin film in the protection layer of comparative example 1 had an IR absorptivity of 25% and an IR reflectivity of 30%. As a result, the higher-side surface temperature was 150° C. while the lower-side surface temperature was 39° C.

COMPARATIVE EXAMPLE 13

A 12-μm-thick aluminum foil was used as a metal foil for a protection layer. When evaluating the case not using a resin film as a protection layer, the IR reflectivity was 95%. The higher-side surface temperature was 100° C. while the lower-side surface temperature was 31° C. However, before elapsing 10 days after the use, confirmed were gradual temperature rises at the lower-temperature and higher-temperature sides. This can be considered as an increasing IR absorption due to oxidational deterioration.

COMPARATIVE EXAMPLE 14

A 12-μm-thick aluminum foil was used as a metal foil for a protection layer while a 120-μm-thick polyimide film was used as a resin film.

The polyimide film had an IR absorptivity of 80% while the vacuum heat-insulating material in comparative example 3 had an IR reflectivity of 20%. The higher-side surface temperature was 170° C. while the lower-side surface temperature was 45° C. Confirmed were temperature rises respectively of 15° C. and 3° C. as compared to the case with no provision, but no radiation-heat-conduction suppressing effect was confirmed. Conversely, a temperature rise due to IR absorption was confirmed.

COMPARATIVE EXAMPLE 15

A 12-μm-thick aluminum foil at its matte surface was used as a metal foil for a protection layer while a 10-μm-thick non-oriented CPP film was used as a resin film. The CPP film had an IR absorptivity of 17% while the vacuum heat-insulating material in comparative example 4 had an IR reflectivity of 45%.

As a result of evaluation, the higher-side temperature was 157° C. while the lower-side temperature was 43° C. Confirmed were temperature rises respectively of 7° C. and 4° C. as compared to the case with no provision, resulting in a determination there is no radiation-heat-conduction suppressing effect.

Figure 24:
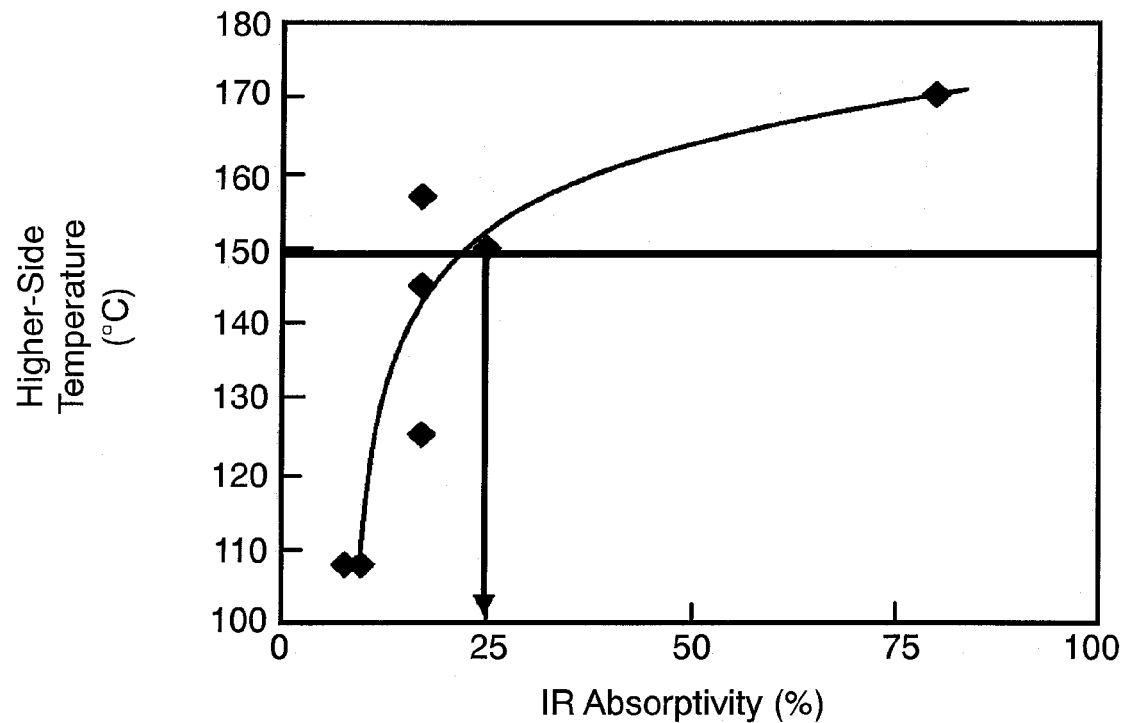
FIG. 24 is a characteristic figure showing a relationship between an IR absorptivity and a higher-side temperature.
Figure 25:
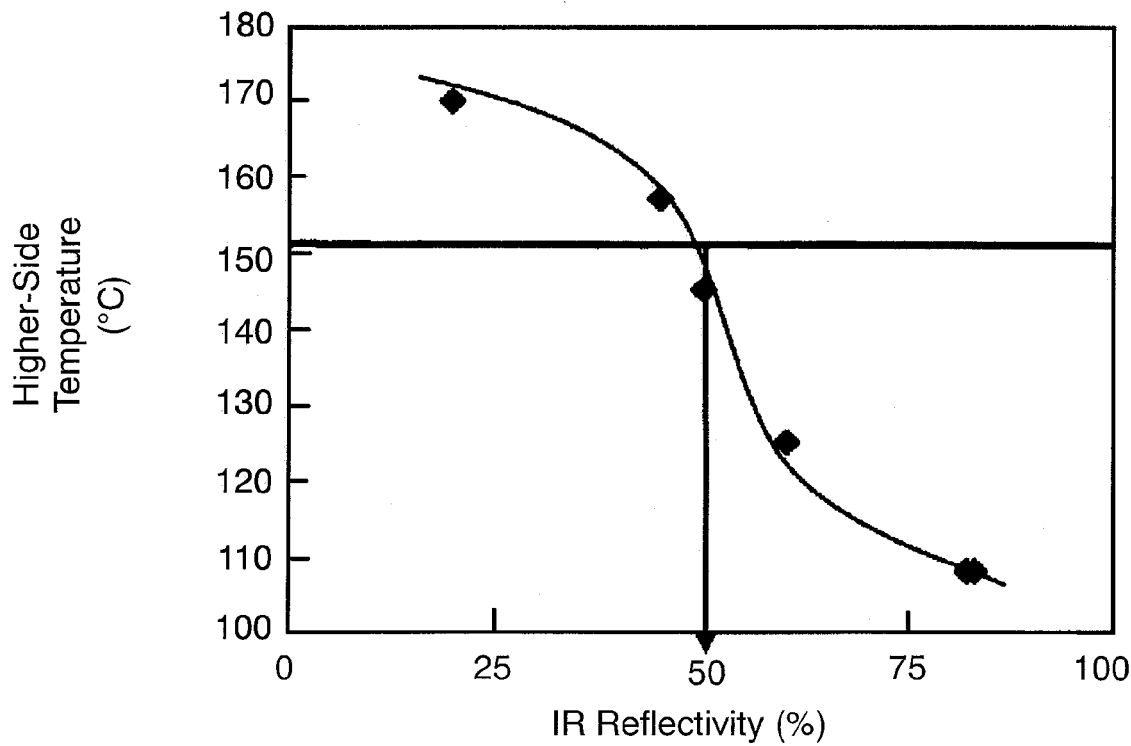
FIG. 25 is a characteristic figure showing a relationship between an IR reflectivity and a higher-side temperature.
Figure 26:
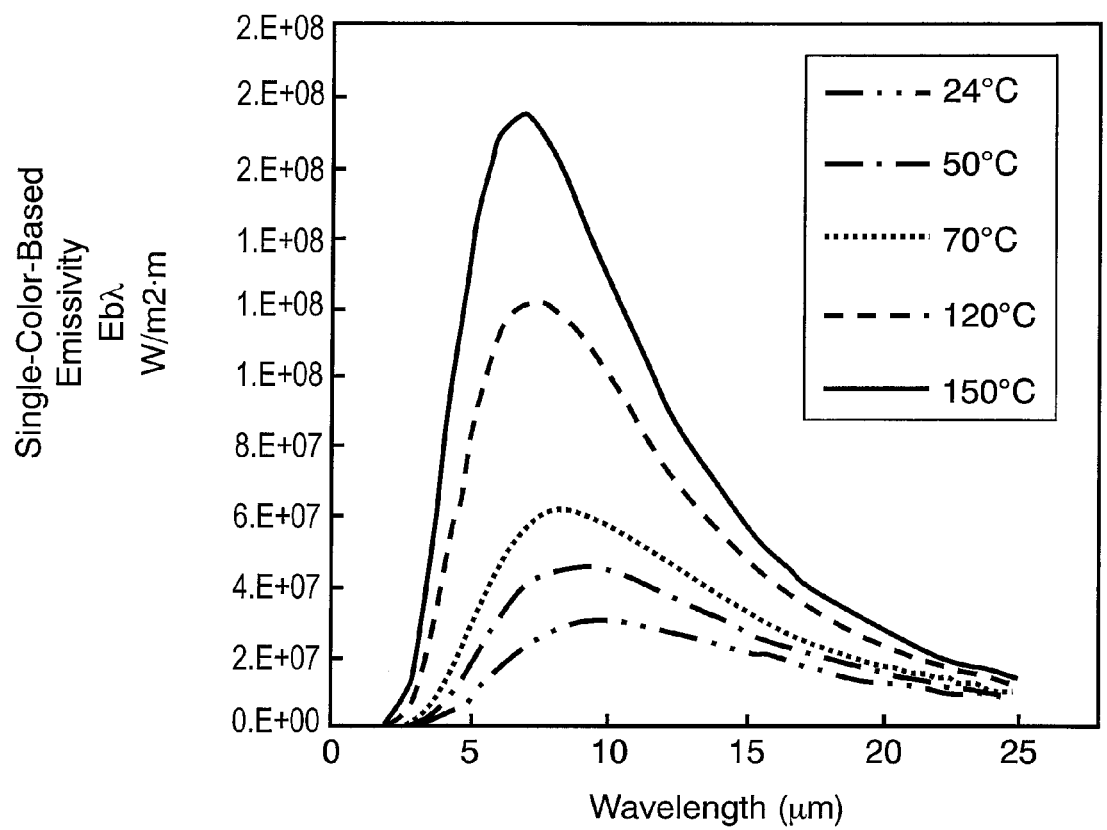
FIG. 26 is a characteristic figure of temperature-based radiation-heat emission spectrums.

Concerning examples 15 to 18 and comparative examples 12 to 15, there are shown in FIG. 24 a relationship between an IR absorptivity and a higher-side temperature and in FIG. 25 a relationship between an IR reflectivity and a higher-side temperature. From FIG. 24, it can be presumed that, at an IR absorptivity of lower than 25%, the higher-side temperature becomes lower than 150° C. of comparative example 12 thus providing an effect appearing. From FIG. 25 similarly, it can be presumed that a radiation-heat-conduction suppressing effect is available at an IR reflectivity of 50% or higher.

Using the existing lamination technique, bonding usually is made between the thermal bonding layer and the gas-barrier layer and between the gas-barrier layer and the protection layer. This is true for the layers of a resin film and a metal foil, in the protection layer. Taking account of an IR absorption due to adhesive, it is desired to suppress the use amount of adhesive to a possible extent.

The invention is characterized in that the protection layer is structured by alternate layers with a resin film and a metal foil. As a result, the IR, converted into in-solid conduction without reflected upon the first metal foil reached after transmitted the first resin film, is to be further reflected upon the second metal foil even passed the second resin film. Thus, further excellent radiation-heat-conduction suppressing effect can be exhibited. Although the number of layers if greater is more effective, it is possible to select an optimal number of layers in accordance with application temperature and cost.

Furthermore, the invention is characterized in that the protection layer is structured with a single-layer resin film and a layered metal foil. The IR, transmitted the resin film and converted into in-solid conduction without reflected upon the first metal foil layer, is to be reflected upon the second metal foil. Thus, a further excellent radiation-heat-conduction suppressing effect can be exhibited. As compared to the alternate layers with resin films and metal foils, there is somewhat great influence of in-solid heat conduction due to contact between metal foils. This accordingly is inferior in the capability of radiation-heat conduction suppression but economical.

The envelope material, having the protection layer having a radiation-heat-conduction suppressivity, in the invention is used in a surface at a higher-temperature side at least when the vacuum heat-insulating material is set up. The envelope material, having the protection layer having a radiation-heat-conduction suppressivity, is requisitely applied basically to the higher-temperature side, though it may be applied to the lower-temperature side together with to the higher-temperature side.

It is rather economical to use the envelope material, as usually used, on the lower-temperature side and the protection layer having a radiation-heat-conduction suppressivity only on the higher-temperature side.

The vacuum heat-insulating material in the invention is capable of sustaining an IR-reflective capability over a long term and exhibiting an excellent radiation-heat-conduction suppressivity.

Because the surface temperature of the vacuum heat-insulating material is lowered by providing the radiation-heat-conduction suppressivity, use is possible even in a high-temperature range where application is conventionally difficult to implement. Because the temperature-dependent deterioration of heat conductivity is also prevented, excellent heat-insulation capability can be drawn out.

Meanwhile, the vacuum heat-insulating material is suppressed against the deterioration due to lowering of the surface temperature thereof, to provide a high heat-insulation capability over a long term.

INDUSTRIAL APPLICABILITY

A film for suppressing conduction of radiation heat in the invention and a vacuum heat-insulating material using the same can sustain an IR-reflective capability over a long term and exhibiting an excellent radiation-heat suppression. As a result, application is possible for heat insulation of a space requiring to suppress against radiation-heat conduction, for heat shield at a location where a heat-generation source and a precision material less resistive to heat are adjacent.

The invention claimed is:
1. A vacuum heat-insulating material comprising:
   a core material; and
   an envelope material covering the core material;
   wherein the envelope material has an interior reduced in pressure, the envelope material having a lamination structure having a thermal bonding layer, a gas-barrier layer and a protection layer having a radiation-heat-conduction suppressivity;
   the protection layer using a film for suppressing conduction of radiation heat comprising:
   a resin film having at least an infrared-ray absorptivity of lower than 25%;
   an infrared-ray-reflection layer; and
   an adhesive layer;
   wherein an infrared-ray reflectivity is 50% or higher,
   the infrared-ray-reflection layer being a metal foil, wherein the adhesive layer of the protection layer has a bonding area which laminates together the resin film and the infrared-ray-reflection layer and a non-bonding area which does not laminate together the resin film and the infrared-ray-reflection layer.

2. The vacuum heat-insulating material of claim 1, wherein the protection layer is layered and contains at least two layers of the resin film and at least two layers of the metal foil and wherein the at least two layers of the resin film and the at least two layers of the metal foil are arranged alternately in the protection layer.

3. The vacuum heat-insulating material of claim 1, wherein the protection layer is formed with the resin film in a single layer and the metal foil layered.

4. The vacuum heat-insulating material of claim 1, wherein the metal foil of the protection layer is an aluminum foil.

5. The vacuum heat-insulating material of claim 1, wherein the resin film of the protection layer is a fluorinated resin film.

6. The vacuum heat-insulating material of claim 1, wherein the resin film of the protection layer is a polyphenylene sulfide film.

7. A vacuum heat-insulating material comprising:
   a core material; and
   an envelope material covering the core material;
   wherein the envelope material has an interior reduced in pressure, the envelope material having a lamination structure having a thermal bonding layer and a protection layer having a radiation-heat-conduction suppressivity;
   the protection layer using a film for suppressing conduction of radiation heat comprising:
   a resin film having at least an infrared-ray absorptivity of lower than 25%;
   an infrared-ray-reflection layer; and
   an adhesive layer;
   wherein an infrared-ray reflectivity is 50% or higher,
   the infrared-ray-reflection layer being a metal foil, wherein the adhesive layer of the protection layer has a bonding area which laminates together the resin film and the infrared-ray-reflection layer and a non-bonding area which does not laminate together the resin film and the infrared-ray-reflection layer, and wherein the metal foil of the protection layer is formed as a gas-barrier layer.

8. The vacuum heat-insulating material of claim 1, wherein the envelope material, having the protection layer having a radiation-heat-conduction suppressivity, is used in a surface that is to become a higher-temperature side at least when the vacuum heat-insulating material is set up.

9. The vacuum heat-insulating material of claim 8, wherein the envelope material, on the surface that is to become a higher-temperature side when the vacuum heat-insulating material is set up, is greater in size than the envelope material on a lower-temperature side.

* * * * *